US012734780B2

(12) United States Patent
Talda et al.

(10) Patent No.: US 12,734,780 B2
(45) Date of Patent: Sep. 15, 2026

(54) METHOD OF FORMING A PACKAGING ENCLOSURE WITH AN EXPANDABLE PACKAGING MATERIAL

(71) Applicant: IOW, LLC, Renton, WA (US)

(72) Inventors: Timothy Alan Talda, Renton, WA (US); John Michael Moran, West Linn, OR (US)

(73) Assignee: IOW, LLC, Renton, WA (US)

( * ) Notice: Subject to any disclaimer, the term of this patent is extended or adjusted under 35 U.S.C. 154(b) by 0 days.

(21) Appl. No.: 19/295,172

(22) Filed: Aug. 8, 2025

(65) Prior Publication Data

US 2025/0360686 A1 Nov. 27, 2025

Related U.S. Application Data

(60) Continuation of application No. 18/443,506, filed on Feb. 16, 2024, now Pat. No. 12,496,798, which is a division of application No. 17/514,005, filed on Oct. 29, 2021, now Pat. No. 11,931,985.

(60) Provisional application No. 63/153,918, filed on Feb. 25, 2021, provisional application No. 63/111,544, filed on Nov. 9, 2020.

(51) Int. Cl.
*B31D 5/00* (2017.01)
*B65D 81/02* (2006.01)

(52) U.S. Cl.
CPC ........... *B31D 5/0043* (2013.01); *B65D 81/02* (2013.01)

(58) Field of Classification Search
CPC .......... B31D 5/0043; B31D 2205/0023; B31D 2205/0047; B31D 2205/0064; B31D 2205/0082; B31D 5/006; B31D 5/0065; B65D 81/02; B65D 81/03; B65B 55/20
See application file for complete search history.

(56) References Cited

U.S. PATENT DOCUMENTS

| | | | | |
|---|---|---|---|---|
| 2,203,084 A * | 6/1940 | Evans | B65D 5/02 229/101 |
| 3,212,229 A | 10/1965 | Vreeland et al. | |
| 3,330,090 A | 7/1967 | Court et al. | |
| 3,359,703 A | 12/1967 | Quaadgras | |
| 3,501,887 A | 3/1970 | Umholtz et al. | |
| 3,544,419 A | 12/1970 | Gerard | |
| 3,762,125 A | 10/1973 | Prena | |
| 3,796,021 A | 3/1974 | Toss | |

(Continued)

OTHER PUBLICATIONS

International Search Report, PCT/US2025/049992, dated Dec. 4, 2025, 14 pages.

(Continued)

*Primary Examiner* — Shelley M Self
*Assistant Examiner* — Katie L Gerth
(74) *Attorney, Agent, or Firm* — Sand, Sebolt & Wernow Co., LPA

(57) ABSTRACT

A packaging material including one or more expandable layers that provide protection to contents of a packaging enclosure formed with the packaging material. The packaging material includes at least a first layer and a second layer bonded to one another. The first layer is pulled or extended in a first direction that is effective to cause the second layer to expand in a second direction. The second layer is a cut-patterned layer which creates structural strength in the packaging material when expanded.

20 Claims, 10 Drawing Sheets

(56) References Cited

U.S. PATENT DOCUMENTS 3,968,287 A * 7/1976 Balk .................. B32B 37/0084
428/137
4,011,798 A 3/1977 Bambara et al.
4,169,345 A 10/1979 Douwenga
4,331,725 A * 5/1982 Akao ...................... B32B 27/32
428/317.5
4,550,046 A * 10/1985 Miller ...................... B32B 3/12
428/116
4,617,785 A 10/1986 Chikatani et al.
5,235,792 A 8/1993 Hanagata
5,241,800 A 9/1993 Steinke et al.
5,394,778 A 3/1995 Sakowski
5,519,982 A 5/1996 Herber et al.
5,538,778 A 7/1996 Hurwitz et al.
5,688,578 A * 11/1997 Goodrich ............... B65D 81/05
428/184
6,058,681 A 5/2000 Recchia, Jr.
10,226,907 B2 3/2019 Goodrich
10,442,574 B2 * 10/2019 Kuchar ................ B65D 27/005
10,764,106 B2 9/2020 Nakayama
10,773,839 B1 * 9/2020 Talda ...................... B65B 61/28
10,850,891 B2 * 12/2020 Yan ......................... B31B 70/20
10,981,712 B2 * 4/2021 Goodrich ............... B65D 27/00
11,130,620 B1 * 9/2021 Hoffman .............. B65D 65/406
11,351,750 B2 6/2022 Cheich et al.
11,572,225 B2 2/2023 Wehrmann
11,702,261 B2 * 7/2023 Goodrich ............. B31D 3/0207
428/136
11,718,435 B2 8/2023 Magnell et al.
11,807,440 B2 11/2023 Jobe
12,017,820 B2 * 6/2024 Yan ........................ B65D 31/02
12,168,334 B2 * 12/2024 Goodrich ............... B65D 81/03
12,304,680 B2 5/2025 Talda et al.
2001/0009089 A1 7/2001 Todd et al.
2003/0089817 A1 5/2003 Hanson et al.
2006/0218881 A1 10/2006 Sperry et al.
2007/0175181 A1 8/2007 Harper
2009/0013655 A1 1/2009 Monti
2009/0277140 A1 11/2009 Tsuruta et al.
2010/0011710 A1 1/2010 Pape
2015/0140265 A1 5/2015 Page
2015/0329230 A1 11/2015 Rasi
2016/0280425 A1 9/2016 Wehrmann et al.
2017/0107017 A1 * 4/2017 Kuchar .............. B65D 81/3461
2017/0203866 A1 * 7/2017 Goodrich ............. B31D 5/0069
2017/0225813 A1 8/2017 Wehrmann
2017/0313017 A1 * 11/2017 Cheich ................. B31D 5/0065
2018/0265228 A1 9/2018 Hagestedt et al.
2019/0100369 A1 * 4/2019 Hoffman .............. B65D 65/406
2020/0207500 A1 7/2020 Kalinowski et al.
2020/0307866 A1 * 10/2020 Yan ...................... B31D 5/0065
2020/0307867 A1 10/2020 Yan
2020/0377278 A1 12/2020 Orsini et al.
2020/0407088 A1 12/2020 White et al.
2021/0009291 A1 1/2021 Campbell
2021/0206535 A1 * 7/2021 Yan ........................ B65D 81/03
2021/0229849 A1 7/2021 Sabato et al.
2021/0252821 A1 8/2021 Goodrich
2022/0002059 A1 * 1/2022 Asayama ............... B65D 81/03
2022/0002069 A1 1/2022 Wetsch
2022/0041312 A1 2/2022 Vilag et al.
2022/0219852 A1 7/2022 Matsuhisa
2023/0002096 A1 1/2023 Talda et al.
2023/0322445 A1 * 10/2023 Yan ...................... B31D 5/0065
2023/0391040 A1 12/2023 Macgillivary
2024/0018725 A1 1/2024 Halcomb et al.
2024/0051725 A1 * 2/2024 Starks .................... B65D 81/03
2024/0100800 A1 3/2024 Wetsch
2024/0190117 A1 6/2024 Talda
2024/0286372 A1 8/2024 Goodrich
2024/0300698 A1 * 9/2024 Yan ...................... B31D 5/0065
2024/0368839 A1 11/2024 Goodrich
2024/0375824 A1 11/2024 Wetsch
2025/0063995 A1 2/2025 De Jong
2025/0214731 A1 7/2025 Shibata

OTHER PUBLICATIONS

International Search Report, PCT/US2025/049967, dated Dec. 1, 2025, 8 pages.
International Search Report, PCT/US2024/049979, dated Dec. 4, 2025, 14 pages.

* cited by examiner

METHOD OF FORMING A PACKAGING ENCLOSURE WITH AN EXPANDABLE PACKAGING MATERIAL

REFERENCE TO RELATED APPLICATIONS

This application is a Continuation of U.S. patent application Ser. No. 18/443,506 filed Feb. 16, 2024, which is a Divisional of U.S. patent application Ser. No. 17/514,005 filed Oct. 29, 2021, now U.S. Pat. No. 11,931,985, which application claims the benefit of U.S. Provisional Application Ser. No. 63/111,544 filed on Nov. 9, 2020.

U.S. application Ser. No. 17/514,005, now U.S. Pat. No. 11,931,985, also claims the benefit of U.S. Provisional Application Ser. No. 63/153,918 filed on Feb. 25, 2021.

The disclosures of the above-referenced patent applications are incorporated herein by reference in their entirety.

TECHNICAL FIELD

This disclosure is generally directed to packaging materials. More particularly this disclosure is directed to a fully-recyclable packaging material comprising at least a first layer and a second layer operatively engaged with one another. In the packaging material expansion of the first layer in a first direction will cause expansion in the second layer in the first direction and in a second direction that is normal to the first direction. When the second layer is expanded in the second direction, the second layer increases in thickness and a plurality of air pockets open up in the layer, thereby providing the packaging material with increased structural strength. The disclosure is further directed to a packaging enclosure made with the expandable packaging material and to a method of customizing a packaging enclosure based on dimensions of an item to be shipped within the packaging enclosure.

BACKGROUND ART

Online shopping has greatly increased the need for packaging products and services that enable safe transit and delivery of items and other goods to the consumer. However, many packaging materials are not recyclable, may be bulky, and tend to get discarded in a landfill after use.

Paper-based packaging products, such as rigid corrugate paperboard (e.g. cardboard), may be recyclable and more environmentally responsible than other types of packaging. However, such cardboard packaging has a limited ability to protect a packaged item if the cardboard is folded because the strength of the cardboard is compromised by such folding and previous package assembly processes. Furthermore, cardboard typically requires an item to be placed in preformed boxed packaging that does not conform to a shape or size of the item to be shipped. While the most appropriately shaped and sized cardboard packaging will typically be selected, it is usually necessary to include additional packaging material (e.g. foam pellets or plastic air pouches) in the packaging to provide adequate protection to the item retained therein. Many of these additional packaging materials are not recyclable. Consequently, to sufficiently protect items during distribution and shipping there is an increased shipping cost and an increased environmental cost. The need for these additional materials also introduces a level of complexity into the packaging of items. As such, current packaging products, systems, and methods leave much to be desired with respect to recyclability, environmental impact, flexibility, and costs.

SUMMARY OF THE INVENTION

The present disclosure is directed to apparatuses of, methods for, and various implementations of a packaging material with one or more expandable layers and to a packaging enclosure formed therewith. In various aspects, a packaging material in accordance with the present disclosure includes at least two layers. A first layer, also referred to herein as a substrate layer, and a second layer, also referred to herein as a cut-patterned layer. The first layer is pulled or extended in at least a first direction that is effective to cause the second layer of the packaging material to expand. Once expanded, the second layer has the benefit of creating structural strength in the packaging material. After operatively engaging the first layer and second layer to one another, the packaging material may be formed into a roll, a sheet, a sleeve, or the like. As such, the disclosed packaging material with expanding layers is suitable for various levels of packaging automation, customer site packaging operations, or preforming into a variety of customized sizes or shapes of packaging enclosure.

In one aspect, a packaging enclosure formed from the disclosed packaging material closely conforms to a size of the item to be packaged therein and because of the inherent structural strength of the packaging material, no additional packaging fillers are required to protect the product being shipped in the enclosure. In this way, the customized packaging requires the consumption of less packaging material than was the case with previously known packaging materials. As a consequence, the customized packaging in accordance with the present disclosure is less expensive to use and more environmentally friendly than previously known packaging materials as there is less packaging to recycle or dispose of after a customer has retrieved the shipped item from the packaging envelope. Furthermore, because the disclosed packaging material is manufactured from fully recyclable materials, the packaging enclosure is able to be recycled instead of being disposed of in a landfill.

In one aspect, an exemplary embodiment of the present disclosure may provide a packaging material comprising a first layer; a second layer operatively engaged with the first layer; wherein the first layer is selectively expandable in at least a first direction; wherein the second layer is expandable in at least the first direction in response to the expansion of the first layer; and wherein the second layer is further expandable in a second direction that is normal to the first direction.

In one embodiment, the first layer is a recyclable material. In one embodiment, the recyclable material is a paper-based material that is paper recyclable. In one embodiment, the second layer is a recyclable material. In one embodiment, the recyclable material is a paper-based material that is paper recyclable. In one embodiment, the first layer is movable between a contracted condition and an expanded condition; wherein the first layer includes one or more folds when in the contracted condition; and wherein when the first layer is moved in the first direction and into the expanded condition, the first layer is free of the one or more folds. In one embodiment, the second layer is movable between a contracted condition and an expanded condition; wherein the second layer includes one or more folds when in the contracted condition; and wherein when the second layer is moved in the first direction and into the expanded condition, the second layer is free of the one or more folds.

In one embodiment, the second layer includes a plurality of slits that extend between an upper surface and a lower surface of the second layer. In one embodiment, the plurality of slits in the second layer is arranged in a pattern. In one embodiment, the pattern of the plurality of slits is uniform across a length and a width of the second layer. In one embodiment, the plurality of slits open up to form air pockets when the second layer is expanded in the first direction. In one embodiment, the second layer increases in thickness when the second layer is expanded in the second direction, wherein the thickness is measured between an upper surface and a lower surface of the second layer.

In one embodiment, the first layer and the second layer expand in an X or Y plane when expanded in the first direction, and the second layer expands in a Z-direction when expanded in the second direction. In one embodiment, the first layer and second layer are bonded to one another in such a way as to allow the first layer and the second layer to expand in the first direction, and to allow the second layer to expand in the second direction. In one embodiment, the packaging material further comprises a third layer that is expandable in the first direction, and wherein the second layer is interposed between the first layer and the third layer. In one embodiment, the third layer is substantially identical to the first layer. In one embodiment, the third layer is substantially identical to the second layer.

In another aspect, an exemplary embodiment of the present disclosure may provide a packaging enclosure for an item; said packaging enclosure comprising a length of a packaging material configured to form a front and a back of the packaging enclosure; an interior cavity bounded and defined by the front and the back, said interior cavity being adapted to receive the item therein; and wherein the packaging material comprises a first layer; a second layer operatively engaged with the first layer; wherein the first layer is expanded in a first direction; wherein the second layer is expanded in the first direction in response to the expansion of the first layer; wherein the second layer is expanded in a second direction that is normal to the first direction; and wherein side edges of the front and back of the length of packaging material are bonded to one another to prevent access to the interior cavity.

In one embodiment, the packaging material includes a third layer that is expanded in the first direction, and wherein the second layer is interposed between the first layer and the third layer, and wherein the third layer comprises a liner that bounds and defines the interior cavity. In one embodiment, the second layer includes a plurality of slits formed therein, and wherein the plurality of slits open up and form air pockets in the second layer when the second layer is expanded in the second direction. In one embodiment, the second layer increases in thickness when expanded in the second direction. In one embodiment, one or both of the first layer and the second layer include one or more folds therein that unfold when one or both of the first layer and the second layer are expanded.

In another aspect, and exemplary embodiment of the present disclosure may provide a method comprising receiving a sheet of packaging material having at least an expandable cut-patterned layer therein; applying a force to the sheet of packaging material; and expanding the cut-patterned layer in a direction substantially normal to a direction of the force.

In one embodiment, the method further comprises selecting a length of the packaging material based on dimensions of an item to be shipped; and forming a packaging enclosure with the length of the packaging material after the cut-patterned layer has been expanded.

The details of one or more implementations of the presently disclosed packaging material and the packaging enclosure formed therewith are set forth in the accompanying drawings and the following description. Other feature and advantages will be apparent from the description and drawings.

BRIEF DESCRIPTION OF THE DRAWINGS

Sample embodiments of the present disclosure are set forth in the following description, are shown in the drawings and are particularly and distinctly pointed out and set forth in the appended claims.

Similar numbers refer to similar parts throughout the drawings.

DETAILED DESCRIPTION

Figure 1:
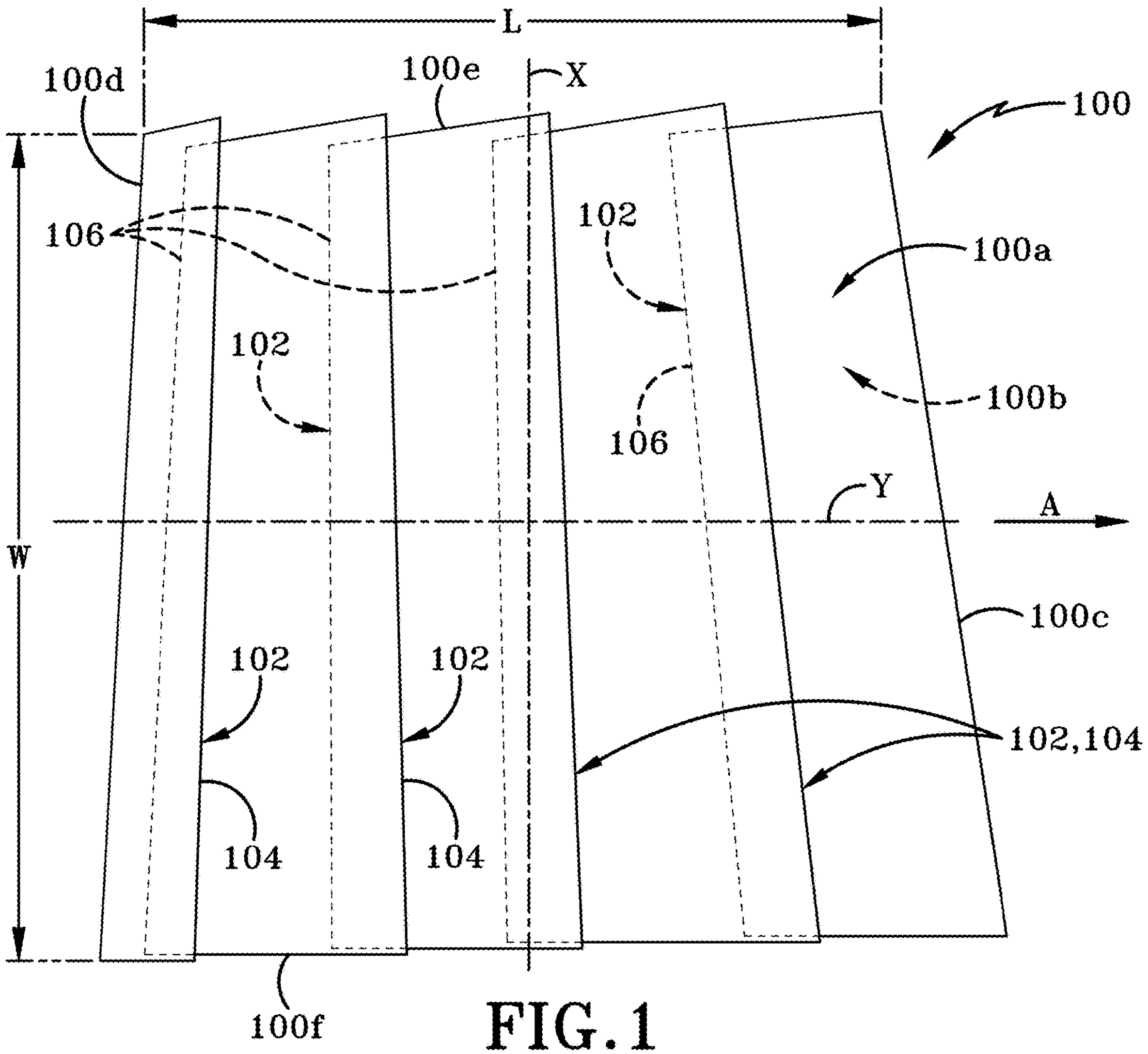
FIG. 1 is a top plan view of an expandable first layer of a section of packaging material in accordance with an aspect of the present disclosure, wherein the first layer is illustrated as including one or more folds and being in an unexpanded condition.

Referring to FIGS. 1 through 14B, there is shown a packaging material in accordance with an aspect of the present disclosure, generally indicated at 10 (FIG. 3) and a packaging enclosure 12, 112 (FIGS. 14A and 14B) formed therewith and useful for retaining and protecting an item 14 to be shipped to a remote location.

Packaging material 10 includes one or more layers which are expandable in order to provide protection to the contents of any packaging enclosure 12, 112 made with packaging material 10. As illustrated in FIG. 3, packaging material 10 includes at least two layers that are operatively engaged with one another. The at least two layers are operatively engaged by being adhered to or otherwise bonded to one another. As illustrated in FIGS. 1 through 14A, the packaging material 10, 110, 210 includes at least an expandable first layer 100 and an expandable second layer 200. Each of these two layers 100, 200 will be discussed in detail hereafter.

Figure 2:
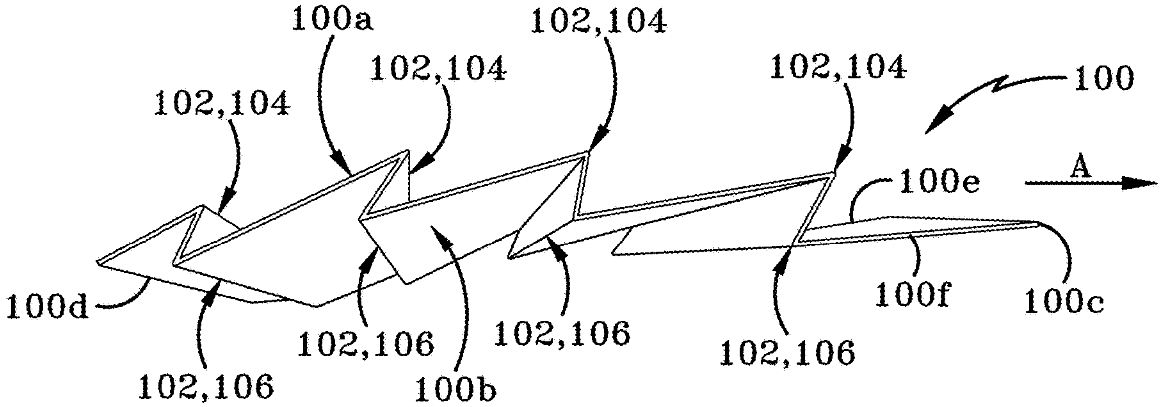
FIG. 2 is a side perspective view of the first layer of the section of packaging material of FIG. 1 showing how the first layer of the packaging material is capable of expanding in length as the one or more folds are unfolded.
Figure 3:
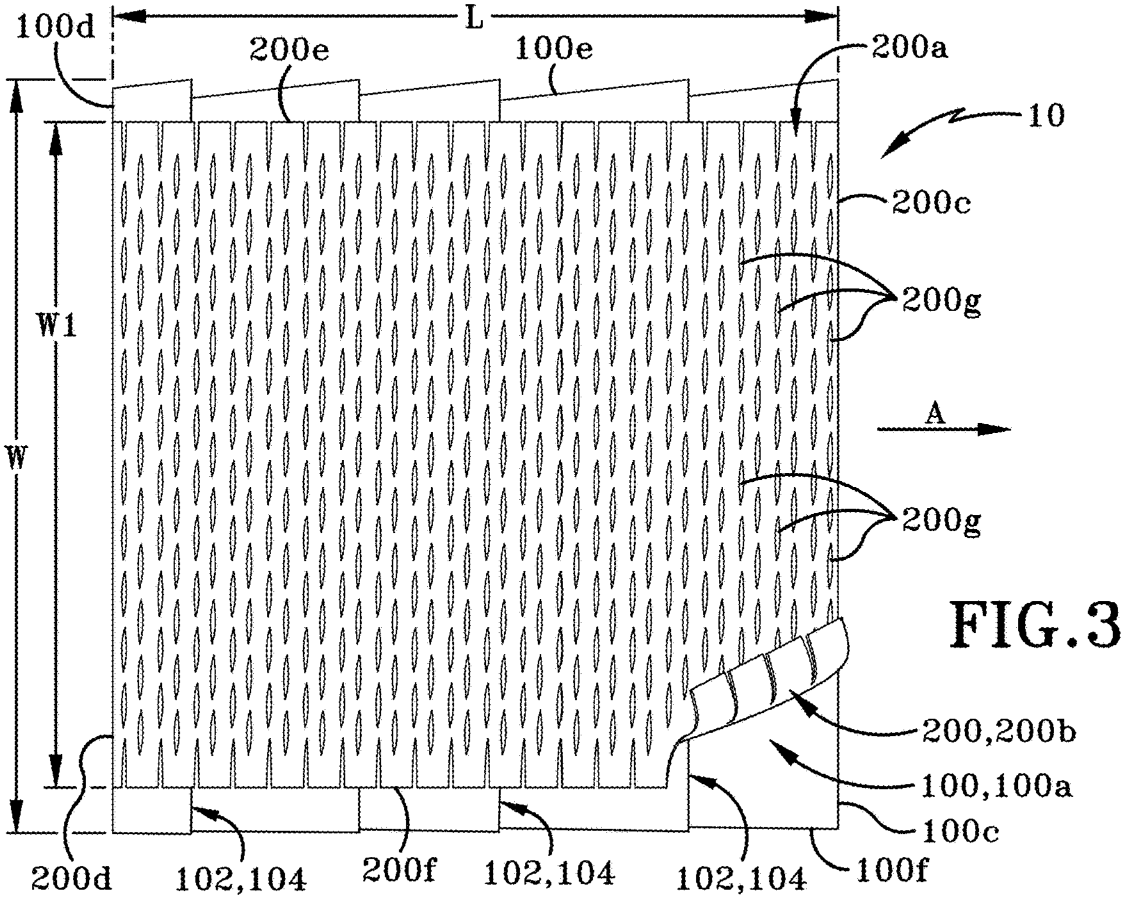
FIG. 3 is a top plan view of a first embodiment of the section of the packaging material showing both the expandable first layer and an expandable second layer, and wherein both the first layer and second layer are in the unexpanded condition.

FIGS. 1 and 2 show an exemplary piece of first layer 100 used in packaging material 10, 110, 210. First layer 100 is also referred to herein as "substrate layer 100" or "carrier layer 100" and these terms may be used interchangeably herein. First layer 100 is formed of paper products and is substantially solid across its width, length, and thickness. In other words, first layer 100 is free of apertures or slits. Because first layer 100 is comprised of paper-based products, the first layer is able to be paper-recycled after use. As will be discussed hereafter first layer 100 is initially solid and flat/smooth but is folded in an initial step in the production of packaging material 10, 110, 210. FIG. 1 shows first layer 100 after the formation of a plurality of folds 102 therein. When first layer 100 is incorporated into packaging material 10, 110, 210, the first layer 100 will be extended in order to activate second layer 200. FIG. 2 shows first layer 100 being stretched or extended and shows the folds 102 beginning to unfold. When packaging enclosure 14 is formed (as will be described later herein), the first layer 100 returns to its original state, i.e., extended, smooth and free of folds 102. As such, first layer 100 is suitable for forming an exterior layer of a packaging enclosure 12 (FIG. 13) that is fabricated with packaging material 10.

Referring to FIGS. 1 through 6, first layer 100 will now be described in greater detail. First layer 100 includes an upper surface 100*a*, a lower surface 100*b*, a first end 100*c*, a second end 100*d*, a first side 100*e*, and a second side 100*f*. A longitudinal axis "Y" (FIG. 1) of first layer 100 extends between first end 100*c* and second end 100*d* and defines a longitudinal direction. A lateral axis "X" of first layer 100 extends between first side 100*e* and second side 100*f* and defines a lateral direction that is oriented at right angles to the longitudinal direction. A vertical axis "Z" (FIGS. 5 and 6) of first layer 100 extends between upper surface 100*a* and lower surface 100*b* and defines a vertical direction that is oriented at right angles to each of the longitudinal direction and lateral direction. The vertical direction (or Z-direction) is normal, i.e., oriented at right angles, to the longitudinal direction and the lateral direction.

Figure 5:
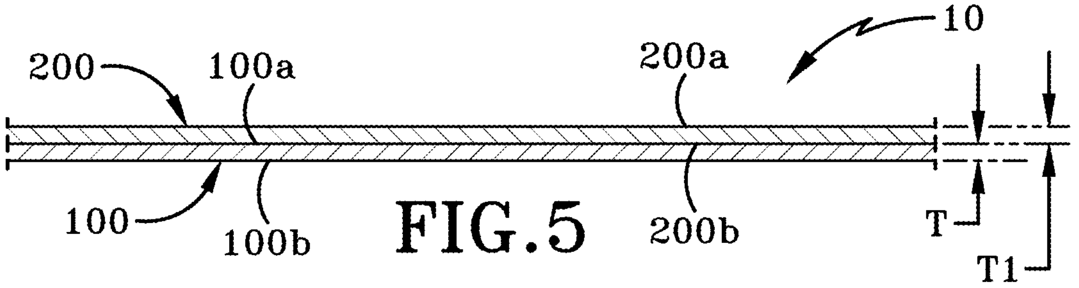
FIG. 5 is a diagrammatic side elevation view of the section of packaging material of FIG. 3 shown in the unexpanded condition.

As discussed earlier herein, first layer 100 is initially smooth and free of folds but prior to forming packaging material 10, a series of folds are formed in first layer 100 in order to reduce the overall length of the layer. In one embodiment, illustrated in FIG. 1, one or more Z-shaped folds 102 are formed in first layer 100 by creating a series of oppositely-oriented creases 104, 106 therein. FIG. 1 shows an exemplary arrangement of first layer 100 in which each crease 104, 106 is oriented generally parallel to lateral axis "X and thereby at right angles to longitudinal axis "Y". Creases 104 are visible when first layer 100 is viewed from above but creases 106 are hidden from view when first layer 100 is viewed from above. When first layer 100 is in this folded or contracted condition, first layer 100 is of a length "L" measured between first end 100*c* and second end 100*d* thereof. First layer 100 is also of a width "W" measured between first side 100*e* and second side 100*f*. As shown in FIG. 5, first layer 100 is also of a thickness "T" as measured between upper surface 100*a* and lower surface 100*b*. As indicated earlier herein, first layer 100 is ultimately returned to an unfolded or expanded condition by stretching or extending (or expanding) first layer 100 and thereby unfolding the various folds 102. Because of the arrangement of the folds 102 illustrated in FIG. 1, when unfolded, first layer 100 is able to stretch, extend, or expand in a first direction oriented parallel to longitudinal axis "Y" and return to its original smooth state and original unfolded length.

It will be understood that in other embodiments (not illustrated herein), the one or more Z-shaped folds may be arranged parallel to longitudinal axis "Y" and in that instance, the first layer 100 is then able to be expanded in a second direction parallel to the lateral axis "X". In yet other embodiments, the first layer may include one or more Z-shaped folds that are oriented oblique to the "Y" axis and/or oblique to the "X" axis and therefore the first layer will be expandable in a direction oblique to one or the other or both of the "Y" axis or "X" axis. In yet other embodiments, multiple differently oriented folds may be formed in the first layer so that first layer is able to expand in one or more directions parallel to longitudinal axis "Y" and/or parallel to lateral axis "X" and or parallel to an axis oblique to the "Y" or "X" axis. It will be understood that the number, orientation, and arrangement of the folds will be selected to suit the particular type of packaging enclosure to be fabricated with the packaging material and the particular packaging equipment that is to be utilized to form the packaging enclosure with the packaging material.

It will further be understood that in other embodiments (not illustrated herein) a different folding pattern other than the illustrated Z-shaped folding pattern may be utilized to initially reduce the overall length and/or width of the first layer. Any suitable folding pattern and orientation of the differently configured folds may be utilized to reduce the overall length and/or width of the first layer 10. It will further be understood that in other embodiments, not illustrated herein), first layer will be configured in such a way as to be expandable without the provision of one or more folds therein.

Figure 4:
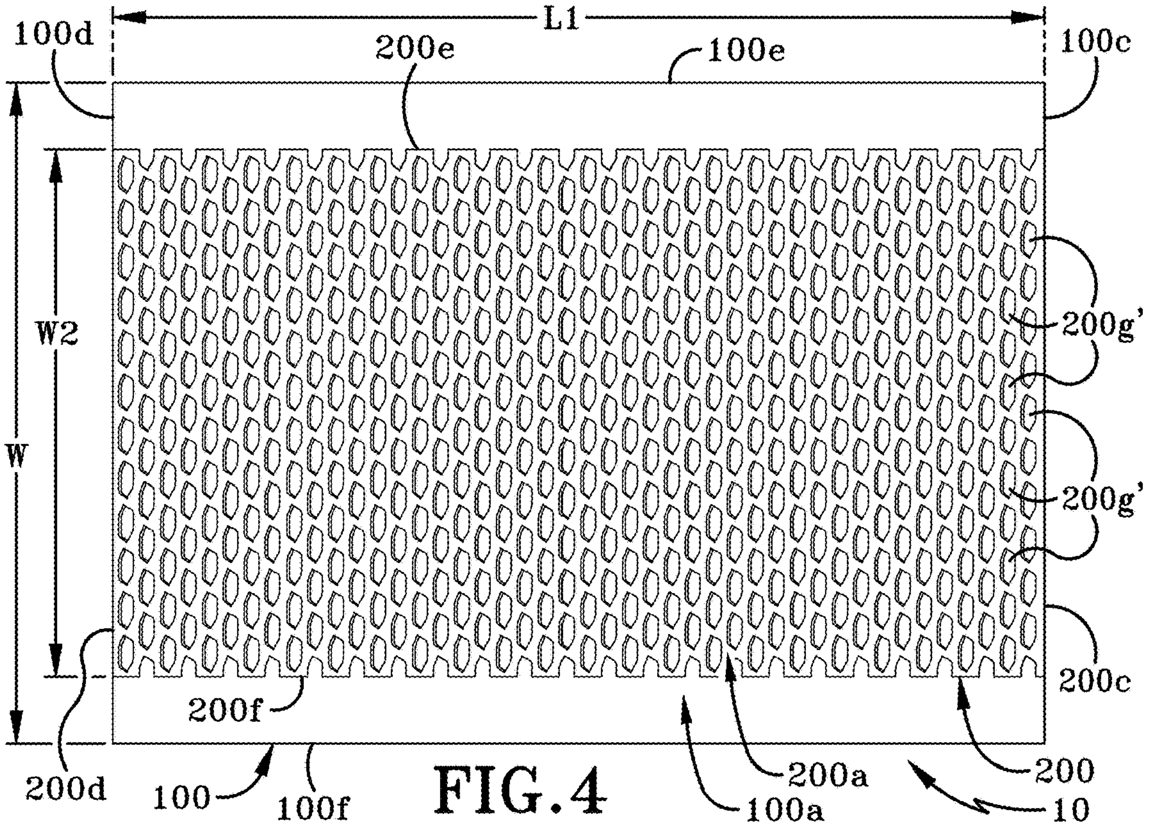
FIG. 4 is a top plan view of the section of the packaging material of FIG. 3 shown in an expanded condition and illustrating that the expanded second layer shrinks slightly in width when the first layer is expanded.

Referring now to FIGS. 3 and 4, second layer 200 is illustrated in conjunction with the unexpanded first layer 100. Second layer 200 may also be referred to herein as "cut-patterned layer 200" or "core layer 200". These terms may be used interchangeably herein. Similar to first layer 100, second layer 200 is comprised of a paper-based product and as such is paper-recyclable.

In some aspects, as described above, the packaging material is paper-based. However, in other aspects, materials other than paper are contemplated for use in packaging material 10. For example, materials such as poly film, polymer film, resin-based film, plastic, TYVEK®, metal fiber composites, fiberglass, etc. (TYVEK is a registered trademark of DUPONT SAFETY & CONSTRUCTION, INC. of Wilmington, Delaware, US), which are used in combination with paper-based materials and/or each other to achieve packaging material 10 with desired features or meeting particular specifications (e.g. for manufacture or assembly). In these other embodiments, one or both of first layer 100 and second layer 200 may be formed from a paper-based product or from a material other than paper. In order to ensure that packaging material 10, 110, 210 and thereby the packaging enclosure formed therewith is fully recyclable, it is preferable that paper-based materials are used for all of the at least two layers of the packaging material in accordance with the present disclosure.

Second layer 200 has an upper surface 200*a*, a lower surface 200*b* (FIGS. 5 and 6), a first end 200*c*, a second end 200*d*, a first side 200*e*, and a second side 200*f*. FIG. 3 illustrates an arrangement where first end 100*c* of first layer 100 is aligned with first end 200*c* of second layer 200. Similarly, second end 100*d* of first layer 100 is aligned with second end 200*d* of second layer 200. FIG. 3 further illustrates an arrangement where first side 100*e* of first layer 100 is located a distance outwardly beyond first side 200*e* of second layer 200*f* and second side 100*f* of first layer 100 is located a distance outwardly beyond second side 200*f* of second layer 200. It will be understood that this arrangement is exemplary only and that both ends 100*c*, 100*d* and sides 100*e*, 100*f* of first layer 100 may be aligned with both ends 200*c*, 200*d* and sides 200*e*, 200*f* of second layer 200. In yet other embodiments, not shown herein, one or more of the ends 200*c*, 200*d*, and/or sides 200*e*, 200*f* of second layer 200 may extend outwardly beyond the associated end and/or side of first layer 100. In other words, the length and width of the first layer 100 and second layer 200 will be selected based upon the particular application in which packaging material 10 is to be utilized and how the packaging material 10 needs to be fabricated in order to fabricate the desired packaging enclosure.

Referring still to FIGS. 3 and 4, a plurality of slits 200*g* is cut into second layer 200. Each slit 200*g* extends between upper surface 200*a* and lower surface 200*b*. The plurality of slits 200*g* is arranged to form a pattern on second layer 200. The pattern is a regular pattern that distributes the slits 200*g* uniformly over the length and width of second layer 200*b*. In other embodiments, the pattern of slits is not regular or uniform over the length of width of the second layer but may be located in particular regions where structural strength ultimately is desired. Any suitable pattern of slits 200*g* may be utilized in second layer 200 based on the end application of the packaging enclosure that is to be fabricated from packaging material 10, 110, 210. The pattern of slits 200*g* illustrated in FIGS. 3 and 4 is exemplary of one possible pattern of slits 200*g* suitable for use in packaging material 10 but other suitable patterns of slits or apertures may be adopted instead.

Figure 7:
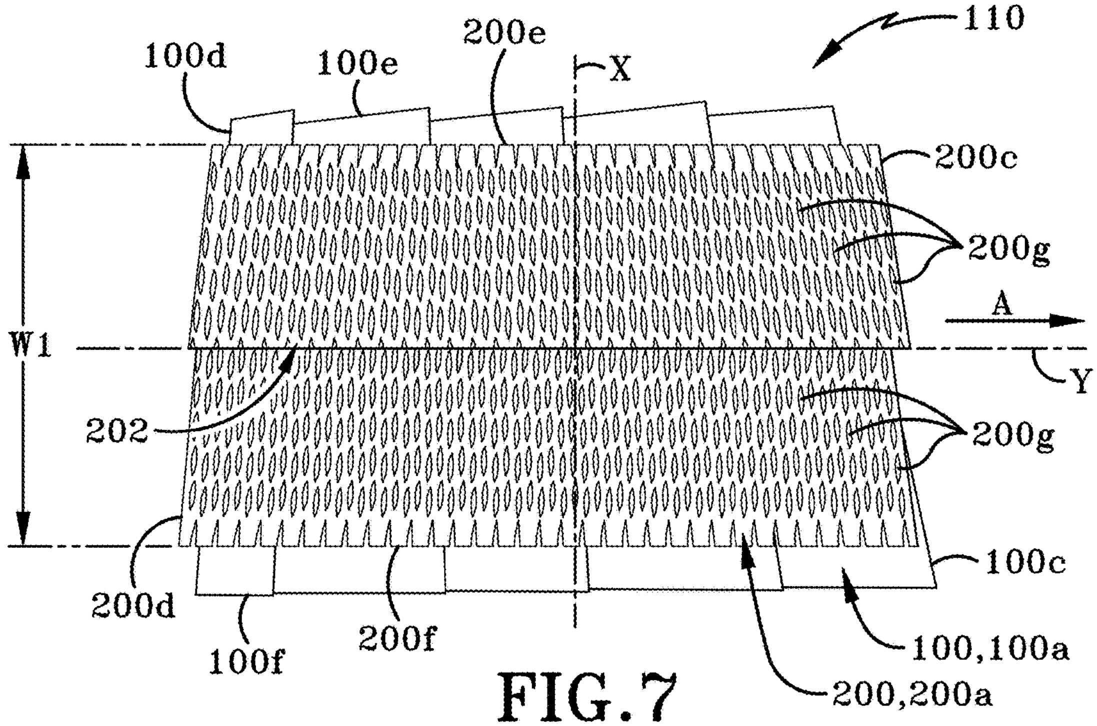
FIG. 7 is a top plan view of a second embodiment of the section of packaging material similar to FIG. 3, wherein both the expandable first layer and the expandable second layer are illustrated in an unexpanded condition, and wherein the second packaging layer includes one or more folds.

FIGS. 3 and 7 show second layer 200 in an initial unexpanded condition. In this unexpanded condition, second layer 200 is of a length "L" that is substantially identical to the length "L" of first layer 100. Second layer 200 also is of a width "W1". In some embodiments, as illustrated in FIG. 3, the width "W1" is less than the width "W" of first layer 100 such that a border region (unnumbered) of first layer 100 extends laterally outwardly beyond first and second side edges 200*e*, 200*f* of second layer 200. In other embodiments, not illustrated herein, the width "W1" of second layer 200 is equal to the width "W" of first layer 100 or is greater than the width "W" of first layer 100.

FIG. 5 shows that the thickness (i.e., height) of first layer 100 is indicated as the thickness "T". The thickness of the unexpanded second layer 200 is indicated as the thickness "T1". In some embodiments, as illustrated in FIG. 5, the thicknesses "T" and "T1" are substantially equal in size but in other embodiments, not illustrated herein, the thickness "T1" of second layer 200 may be less than or more than the thickness "T" of first layer 100.

Second layer 200 is bonded or adhered to first layer 100 in any suitable manner that will allow first layer 100 to activate second layer 200 and thereby allow both first layer 100 and second layer 200 to move from an unstretched or unexpanded condition to an expanded condition. In particular, when a force in the direction "A" (FIGS. 1 and 2) is applied to at least the first layer 100, then first layer 100 will expand, stretch or extend longitudinally from length "L" to length "L1" in the direction "A". It will be understood that the first layer 100 stretches or expands in a plane (from first side 100*e* to second side 100*f*) in the direction "A". Expansion of first layer 100 activates second layer 200 and the second layer 200 will similarly be caused to expand longitudinally in a plane from length "L" to length "L1" in the direction "A".

First layer 100 is therefore a substrate layer or carrier layer to which one or more other expanding layers (such as second layer 200) are bonded or adhered, and this substrate layer or carrier layer has the ability to activate the one or more other expanding layers, causing them to expand.

Figure 6:
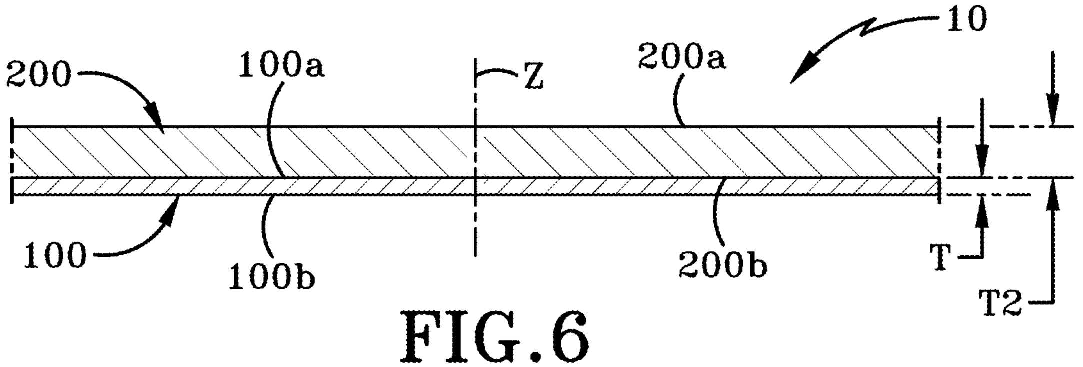
FIG. 6 is a diagrammatic side elevation view of the section of packaging material of FIG. 4 shown in the expanded condition and showing how the second layer has expanded in the Z-direction.

When second layer 200 expands in response to the force and extends in the direction "A", the plurality of slits 200*g* (FIG. 3) will elongate longitudinally and open up, causing air pockets 200*g*' (FIG. 4) to be created in second layer 200 where the slits 200*g* were previously located. Second layer 200 not only expands in the Y-direction with first layer 100 but will also expand in the Z-direction (FIG. 6). Each air pocket 200*g*' adopts a three-dimensional geometric shape as the second layer 200 expands in the Z-direction. Stated differently, when second layer 200 expands longitudinally, the second layer 200 also increases in height and the thickness thereof increases from a thickness "T" to a thickness "T2" (FIGS. 5 and 6). First layer 100 remains of an unchanged thickness "T" upon longitudinal expansion of first layer 100. It will be understood that the geometric shape of the air pockets 200*g*' is determined by the original shape of the slits 200*g* cut into second layer 200. For example, each air pocket 200*g*' may be hexagonal in shape when viewed from above, or ovoid, elliptical, diamond-shaped, octagonal, rectangular cuboid, or of any other desired configuration.

The second layer 200, i.e., the cut-patterned layer 200 is suitable for forming an inside layer of a packaging enclosure 12 (FIG. 14A) fabricated with packaging material 10. Second layer 200 provides protection for the contents of the packaging enclosure inasmuch as the expanded second layer 200 provides compressive strength to the packaging enclosure and exhibits flexibility or cushioning to torsion. The expanded second layer 200 also conforms around objects retained within the packaging enclosure 12, as will be later described herein.

Referring still to FIGS. 1 and 4, and as discussed above, first layer 100 is configured to be pulled or extended in at least a first direction (e.g., in two planes such as X, Y, or X and Y) when a pulling force is applied thereto. When a pulling force in the direction "A" is applied to at least first layer 100, first layer 100 will expand longitudinally in the direction "A", parallel to the longitudinal axis "Y". The Z-shaped folds 102 in first layer 100 will unfold and the creases 104, 106 will flatten out. Substantially simultaneously, second layer 200 will be activated and will expand longitudinally in the direction "A", and will further expand vertically in the Z-direction as the plurality of slits 200*g* open up. When first layer 100 is in the fully unfolded or expanded condition as in FIG. 4, first layer 100 is of the same width "W" as when first layer 100 was in the folded or unexpanded condition (FIG. 1) but the length of first layer 100 has increased from length "L" to length "L1". As is illustrated in FIG. 4, the fully unfolded or expanded first layer 100 is free of any creases 104, 106 or folds 102.

Figure 8:
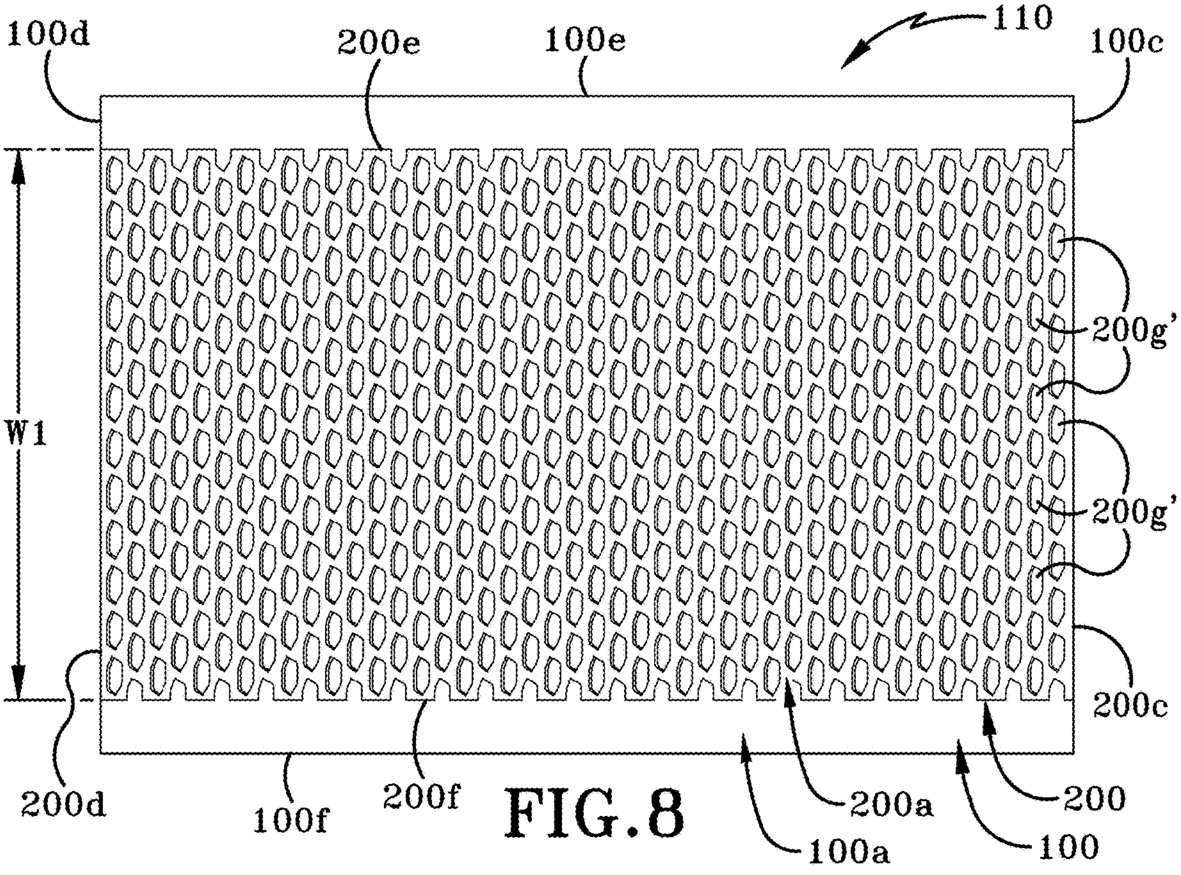
FIG. 8 is a top plan view of the section of packaging material of FIG. 7 shown in the expanded condition, and illustrating that the width of the expanded second layer is substantially unchanged when the first layer is expanded.

The second layer 200 when fully expanded is also of the length "L1" but the width of second layer 200 has shrunk to the width "W2" (FIG. 4). Stated differently, the cut-patterned layer 200 may shrink substantially in width when the packaging material 10 is expanded creating a width mismatch between the cut-patterned layer 200 and the substrate layer 100 to which the second layer 200 is adhered or bonded. Referring to FIGS. 7 and 8, and in order to compensate for the reduction in width during expansion of the second layer 200, the cut-patterned layer 200 is formed and/or cut such that extra material is available in the width thereof. In other words, the cut-patterned layer 200 is provided with a width that is greater than the width "W" of the substrate layer 100 such that, when packaging material 110 is stretched or expanded, the cut-patterned layer 200 maintains a width "W1" approximate to the apparent width "W1" of the second layer 200 prior to expansion thereof. FIGS. 7 and 8 show second layer 200 of packaging material 110 being provided with a width that is greater than the width "W" of the first layer 100. The additional width is initially accommodated by forming one or more folds 202 in second layer 200. FIG. 7 shows one fold 202 formed in second layer 200. Each of the one or more folds 202 is substantially identical to the one or more folds 102 formed in first layer 100 (see FIGS. 1 and 2). As such, each fold 202 is a Z-shaped fold formed by making two oppositely oriented creases in second layer 200, where the two creases are substantially identical to creases 104 and 106 illustrated in FIG. 2. In other embodiments, the one or more folds 202 (like folds 102) may be differently configured from being Z-shaped. As many folds 202 will be provided in second layer 200 to overcome the width shrinkage issue.

FIG. 7 shows that the single fold 202 formed in second layer 200 is oriented parallel to longitudinal axis "Y" and therefore at right angles to lateral axis "X". Fold 202 is therefore oriented at right angles to the folds 102 in first layer 100. In particular, fold 202 is oriented parallel to the direction in which first layer 100 and second layer 200 are to be expanded. In other embodiments, the one or more folds 202 may be oriented the same as or different to the folds 102 in first layer 100.

FIG. 7 shows that the initial width of second layer 200 in the unexpanded packaging material is the width "W1". The fold 202 provides sufficient extra material in second layer 200 that when packaging material 110 is expanded, the final width of second layer 200 will remain as width "W1". As second layer 200 expands longitudinally and vertically in response to that first layer 100 being pulled in the direction "A", the fold 202 will unfold and flatten out as the second layer 200 shrinks laterally. The end result of the fold 202 unfolding and flattening out is that second layer 200 remains of the width "W1" (FIG. 8) while increasing in thickness to thickness "T2". It will therefore be understood that second layer 200 is originally only apparently of the width "W1". The second layer 200 is actually wider than the width "W1". It will be understood that other than the provision of the one or more folds 202 and the original increased width, all other structures and functions of the second layer 200 in packaging material 110 are identical to those of second layer 200 as described above with respect to FIGS. 1 to 4 and packaging material 10. First layer 100 as illustrated in FIGS. 7 and 8 is identical in structure and function to first layer 100 described earlier herein and illustrated in FIGS. 1-4.

While second layer 200 has been disclosed herein as including one or more folds 202 therein, in other embodiments (not illustrated herein) second layer 200 may be made from a material that is expandable without the need for any folds to be formed therein.

It will be noted that first layer 100, i.e., substrate layer 100, preferably remains wider than the second layer's effective width prior to and post expansion of the packaging materials 10 in order to maintain a border on either side of second layer 200. The border region extends between the first side 100*e* and first side 200*e* of first and second layers 100, 200 and between second side 100*f* and second side 200*f* of first and second layers 1001, 200. These border regions are utilized in the formation of the packaging enclosure, as will be described later herein.

In some embodiments, not illustrated herein, a line a weakness may be formed in one or both border regions of packaging material 10, 110, and 210. The line of weakness will be oriented parallel to longitudinal axis "Y" and provides a region on the eventual packaging enclosure 12 that a user can utilize to tear open the sealed packaging enclosure to access the contents therein.

Figure 9:
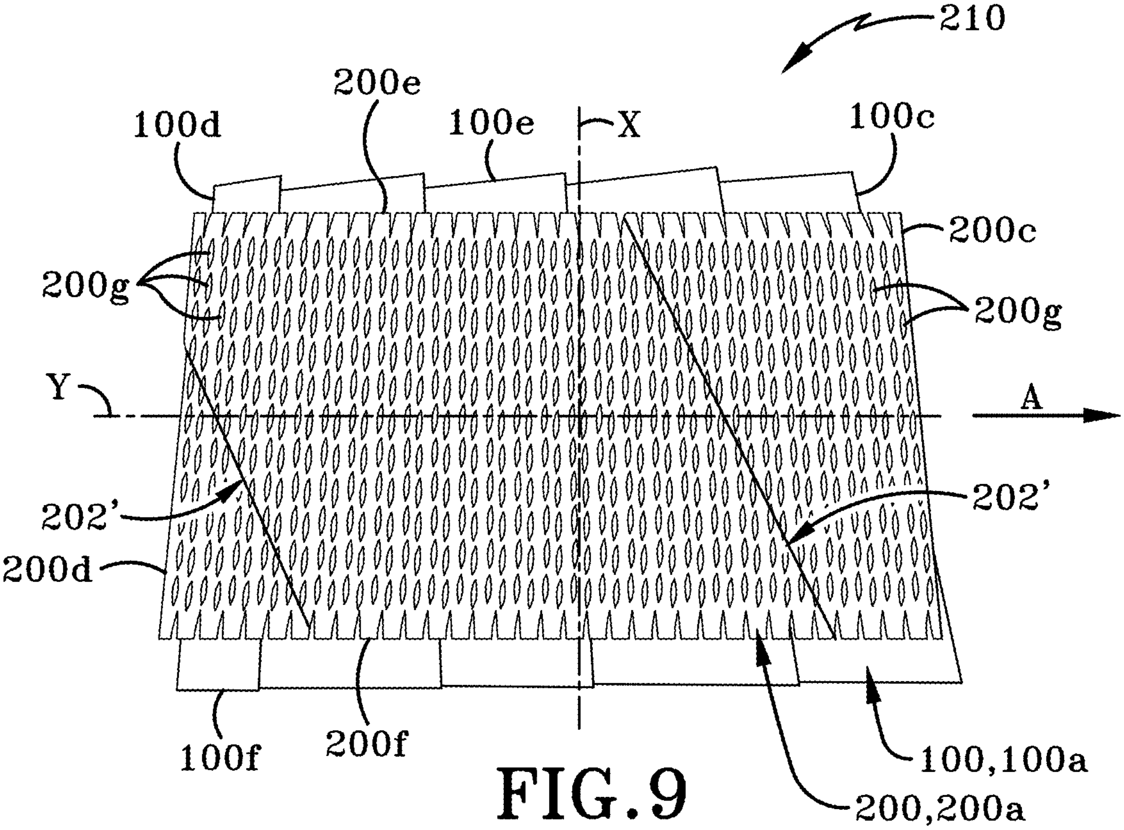
FIG. 9 is a top plan view of a third embodiment of the section of packaging material similar to FIG. 3, wherein both the expandable first layer and the expandable second layer include one or more folds therein, wherein the one or more folds in the second layer are oblique relative to the side edges of the first layer.

Referring now to FIG. 9, a third embodiment of a packaging material in accordance with the present disclosure is illustrated, generally indicated as packaging material 210. Packaging material 210 comprises a first layer 100 that is identical in structure and function to first layer 100 illustrated in FIGS. 1-6. Second layer 200 differs from the second layer 200 illustrated in FIGS. 1 to 4 in that in this third embodiment, the second layer 200 is initially of a greater length than the length "L" of the first layer 100 and second layer 200, and is also of a greater width than the width "W1" of second layer 200. The extra length and width of second layer 200 is accommodated in one or more folds 202' formed therein. Folds 202', like folds 202, are Z-shaped and formed in an identical manner to folds 202. However, the folds 202' differ from the folds 202 formed in the second layer 200 illustrated in FIGS. 7 and 8 in their orientation. As described above, folds 202 are arranged generally parallel to longitudinal axis "Y" of the section of packaging material 110. In packaging material 210, however, the folds 202' are oriented oblique to longitudinal axis "Y" (and therefore are also oriented oblique to lateral axis "X").

When first layer 100 of packaging material 210 is expanded in the direction "A", the one or more folds 102 in first layer 100 and the one or more folds 202' in second layer 200 will unfold and flatten out. The width "W1" and length "L1" of second layer 200 will remain apparently unchanged as packaging material 210 expands in the Z-direction because the extra material in the folds 202' compensates for the shrinking of second layer 200 as the second layer 200 expands vertically. The configuration of second layer 200 in packaging material 200 therefore compensates for shrinkage of second layer 200 in a longitudinal direction and in a lateral direction as the second layer 200 expands longitudinally in the Y-direction and vertically in the Z-direction.

It will be understood that, in other embodiments, the folds 202' will not be Z-shaped, but like folds 102 may be differently configured and differently oriented from what is illustrated in FIG. 9.

It will further be understood that the locations of the one or more folds 102, 202, and 202' in the associated first layer 100 and second layer 200 may be different from what is illustrated in FIGS. 1-9. It will be understood that any desired number of folds 102, 202, and 202' may be formed at any desired position and/or orientation and/or arrangement to suit the application of the packaging method and the apparatus in which packaging material 10, 110, 210 is to be fabricated into a packaging enclosure.

Referring to FIGS. 1-9, second layer 200 will be adhered to or bonded to first layer 100 in each of the packaging materials 10, 110, 210. Second layer 200 may be attached to first layer 100 adjacent a perimeter of second layer 200. Adhesion may be completed in such a way as to avoid inhibiting the unfolding of folds 102 provided in first layer 100. Adhesion adjacent the perimeter of second layer allows the substrate folds 102 and any cut-patterned layer folds 202, 202' to readily unfold as the packaging material is stretched, and further allows the second layer 200 to expand vertically as illustrated in FIG. 8. Adhesion between first layer 100 and second layer 200 may be achieved with adhesive materials, coatings, mechanical means, pressure and/or heat, or any combination thereof.

Figure 10:
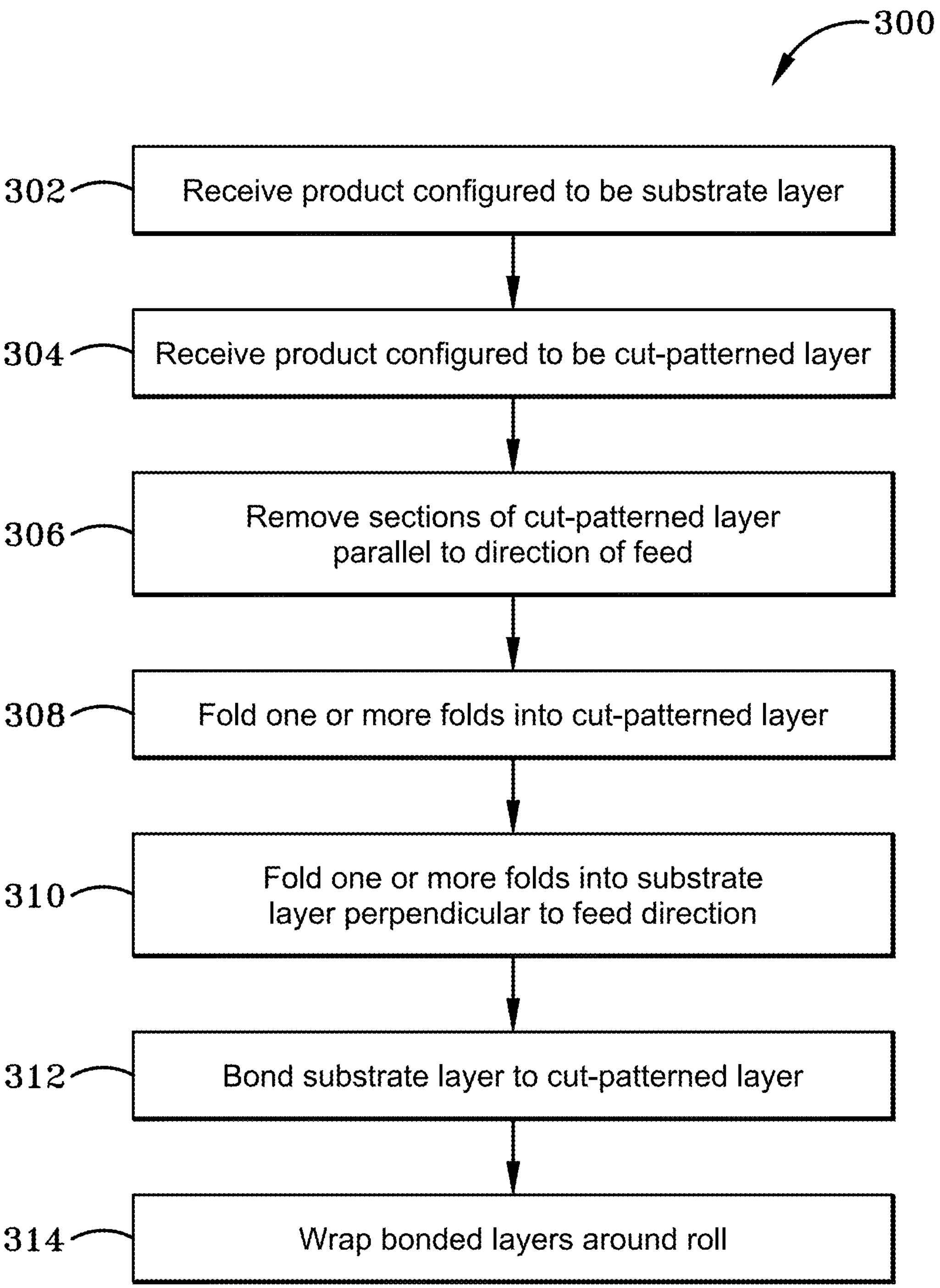
FIG. 10 depicts an exemplary method for implementing the manufacture of the packaging material in accordance with an aspect of the present disclosure.
Figure 11:
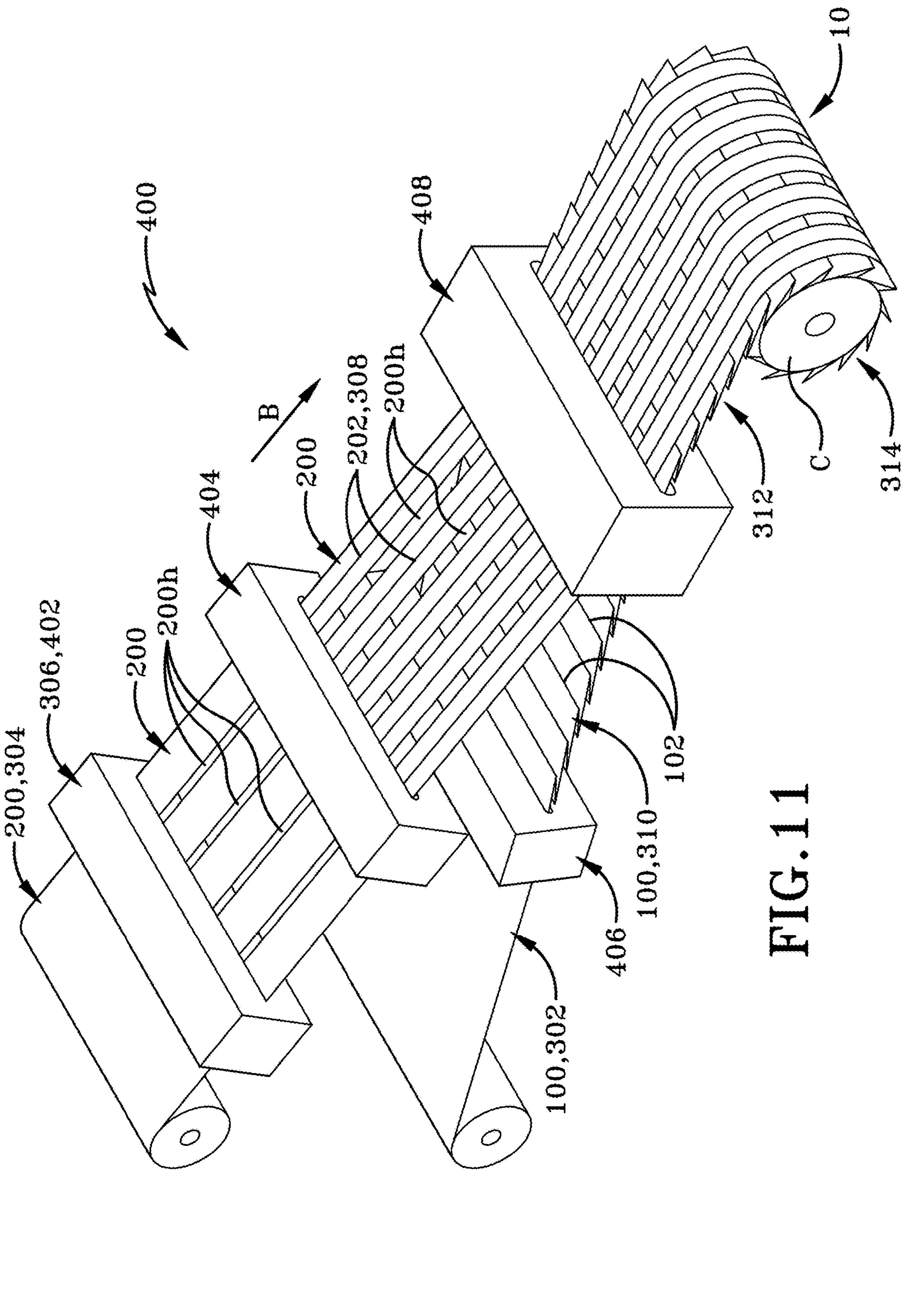
FIG. 11 illustrates an exemplary manufacturing apparatus for the packaging material in accordance with an aspect of the present disclosure.
Figure 12:
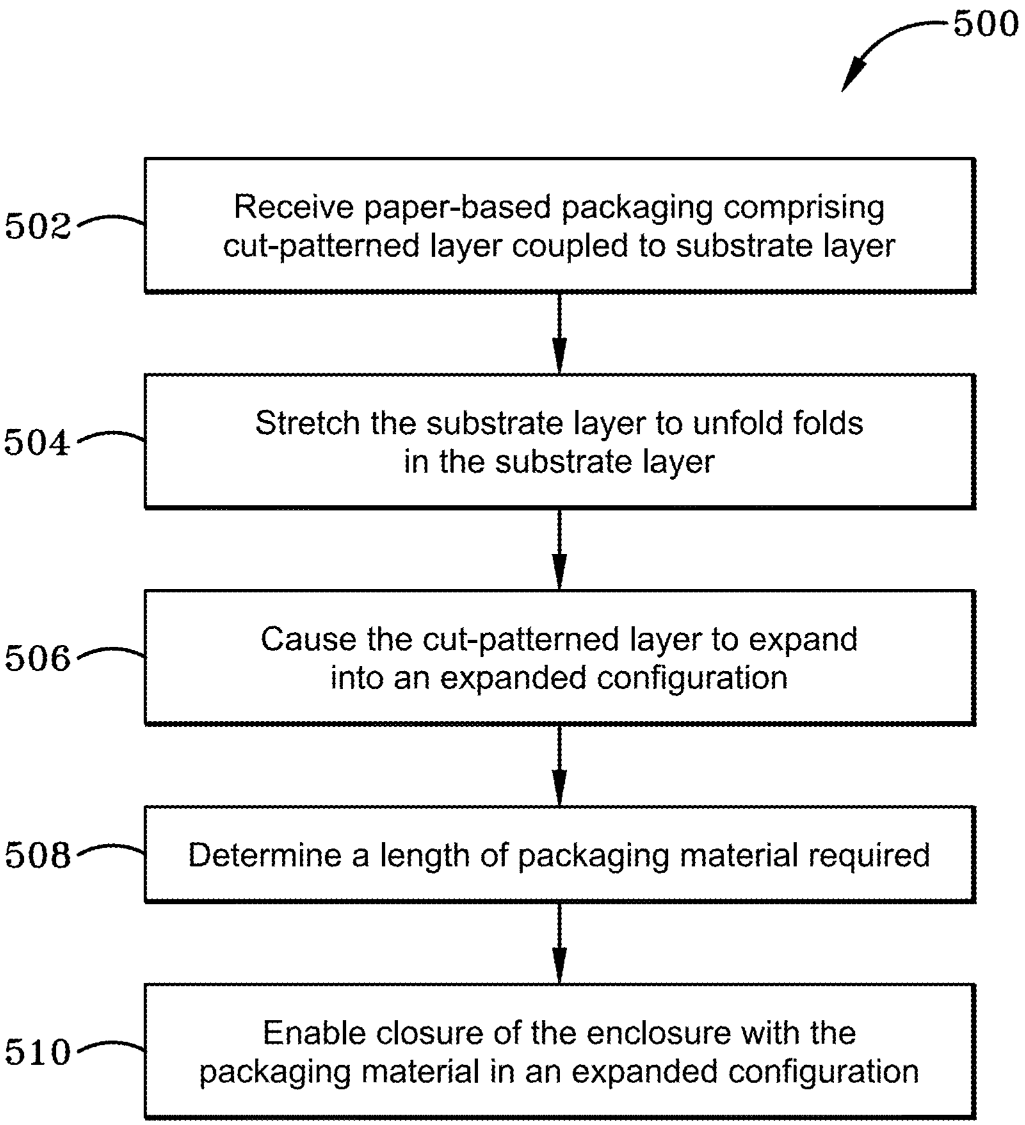
FIG. 12 depicts an exemplary method for creating a packaging enclosure with the packaging material in accordance with the present disclosure.
Figure 13:
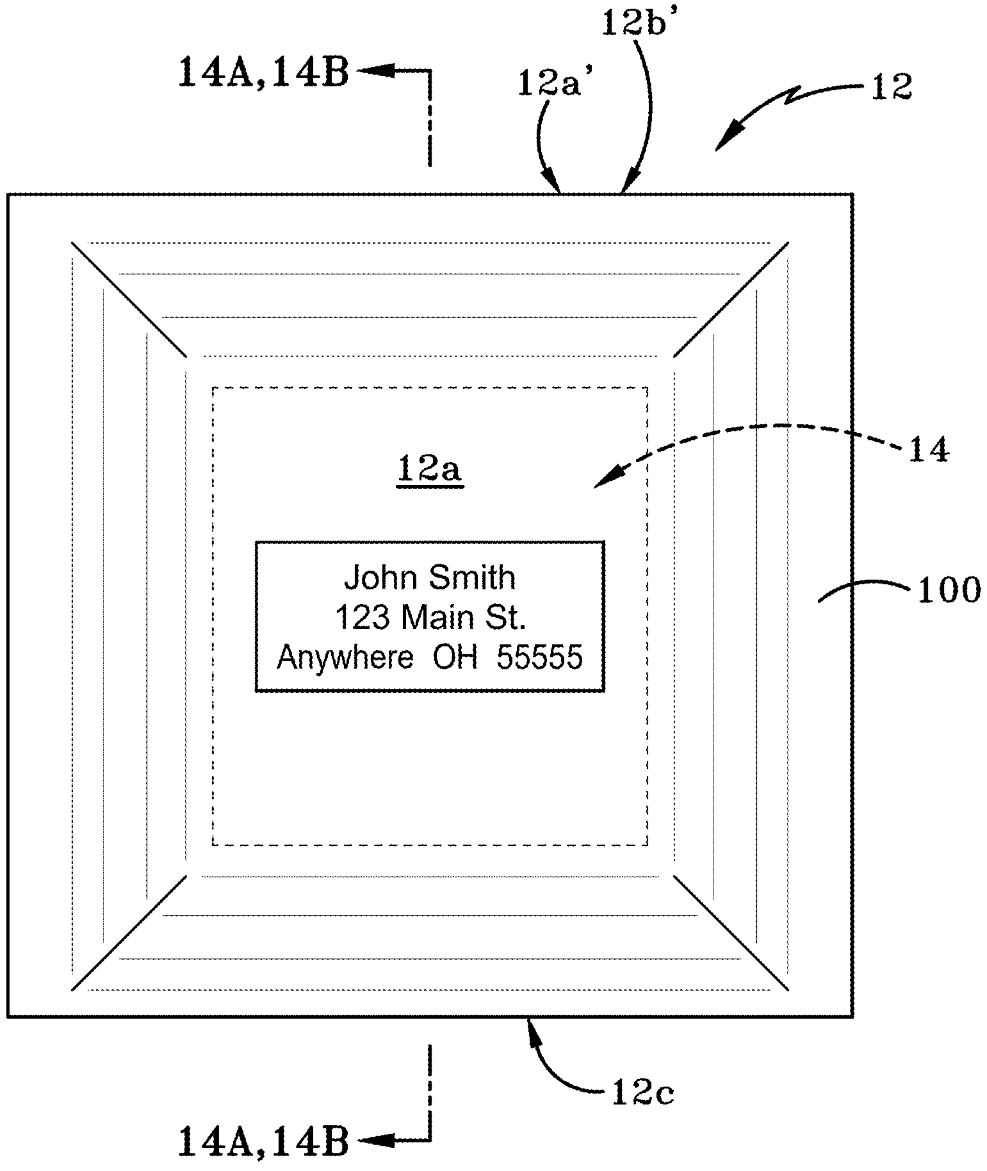
FIG. 13 is a diagrammatic front elevation view of the packaging enclosure made with the packaging material in accordance with the present disclosure.

FIGS. 10 and 11 depict an exemplary method and exemplary apparatus for implementing manufacture of a roll of packaging material 10, 110, 210 in accordance with one or more aspects of the present disclosure. The method and apparatus couples first layer 100 and second layer 200 to form the roll of packaging material 10, 110, 210. The exemplary method is illustrated in FIG. 10 and is generally indicated as method 300. An exemplary apparatus for performing the method 300 is illustrated in FIG. 11 and is generally indicated as apparatus 400.

At 302 in FIGS. 10 and 11, a product is received that is configured to comprise the substrate layer (i.e., first layer 100) of the packaging material 10, 110, and 210. This substrate layer 100 is a paper-based product in one aspect of the present disclosure. In one aspect, the first layer may be kraft paper for example.

At 304, a product is received that is configured to comprise the cut-patterned layer (i.e., second layer 200) of the packaging material 10, 110, and 210. This second layer 200 is a paper-based product in one aspect of the present disclosure. In one aspect, the second layer may be kraft paper or corrugate for example.

At 306, the exemplary apparatus forms slits 200*g* (FIG. 3) in second layer 200. The slits 200*g* are not illustrated in FIG. 11 for clarity of illustration. In other embodiments, second layer 200 may be pre-processed by cutting slits 200*g* in kraft paper or corrugate and then the pre-processed second layer 200 is introduced into the exemplary apparatus in order to couple the second layer 200 to first layer 100.

FIG. 11 illustrates that the second layer 200 is cut longitudinally into narrower width strips that are oriented parallel to a direction of feed "B" of second layer 200 and such that a gap 200*h* is defined between adjacent strips. It will be understood that in other embodiments the second layer 200 may not be cut into narrower strips.

At 308, one or more folds 202 are formed into the second layer 200, i.e., the cut-patterned layer. The one or more folds are Z-shaped folds or another configuration of fold that allows second layer 200 to be fed into and move through the exemplary apparatus. The Z-folds may be located at various positions along the length of the second layer 200 such as oscillating across the width of second layer 200. The one or more folds 202 are arranged parallel to the longitudinal axis "Y" of the second layer 200 and thereby parallel to the feed direction "B" of the second layer 200.

In other embodiments, instead of folds 202 being formed in second layer 200, one or more folds 202' may be formed in second layer 200, where the folds 202' are arranged oblique to the longitudinal axis "Y" and thereby to the feed direction "B". In yet other embodiments (not illustrated herein), one or more folds may be formed in second layer 200 that are oriented at right angles to the longitudinal axis "Y" and thereby to the feed direction "B". As described earlier herein, second layer 200 is capable of expanding in the Z-direction, and thereby increasing in thickness, in response to being pulled, i.e., stretched.

At 310, the substrate layer 100 is folded into one or more folds 102. The one or more folds 102 are Z-shaped folds or another configuration of fold that allows first layer 100 to be fed into and move through the exemplary apparatus. The Z-folds 102 may be located at various positions along the length of the first layer 100. The one or more folds 102 may be arranged perpendicular to the longitudinal axis "Y" of the first layer 100 and thereby perpendicular to the feed direction "B" (FIG. 11). The feed direction "B" is identical to the direction "A" in which packaging material 10, 110, 210 will ultimately be expanded as illustrated in FIGS. 1, 3, 5, and 9.

As described above, the substrate layer 100 is a raw material, such as kraft paper, that is folded by the exemplary apparatus 400. In other embodiments, the substrate layer 100 may be pre-processed by forming folds 102 therein and is then fed into the exemplary apparatus for coupling with second layer 200.

At 312 the first layer 100 and second layer 200 are bonded to one another. In one embodiment first layer 100 and second layer 200 may be bonded near the first and second sides 200*e*, 200*f* of second layer 200. In one embodiment adhesive is not placed along the Z-shaped folds 102, 202, 202' so that these regions of the first layer 100 and/or second layer 200 can readily unfold when packaging material 10, 110, 210 is stretched.

At 314, first layer 100 and second layer 200, which are now coupled and bonded to one another, are wrapped around a roll core "C". Multiple strips of coupled material, i.e., packaging material 10, 110, and 210 may be wrapped around the core "C". The wrapped rolls of packaging material 10 110, 210 may be further processed such as being cut into individual rolls each containing a single smaller strip. In other embodiments, instead of being wrapped around the core "C", the packaging material may be formed into sheets or sleeves, or may be configured in any other manner.

FIG. 11 illustrates an apparatus 400 that may perform the method 300 depicted in FIG. 10. The second layer 200 is introduced into apparatus 400 and passes through a cutting mechanism 402 which cuts the pattern of slits 200*g* therein as described earlier herein. The second layer 200 at this point is unexpanded and so the slits 200*g* are "at rest" and are not opened up to form air pockets, i.e., apertures 200*g'*. After moving through the cutting mechanism 402, the second layer 200 may also be referred to as the cut-patterned layer 200. The cutting mechanism 402 may also remove sections of the cut-patterned layer 200, thereby leaving the gaps 200*h* between elongate strips of cut-patterned layer 200. It will be understood that although the figure illustrates four sections of layer 200 being removed, in other embodiments fewer than four sections or more than four sections of layer 200 may be removed. As described earlier herein, in some embodiments, sections of the cut-patterned layer 200 may not be removed therefrom and in these instances the cutting mechanism 404 will only cut slits 200*g* in second layer 200.

Referring still to FIG. 11, the sectioned cut-patterned layer 200 is fed through a folding mechanism 406 which introduces one or more folds 202 into each elongate strip of second material 200. The folds 202 are oriented parallel to the direction of feed or travel "B". The substrate layer 100 is fed through a second folding mechanism 406 that introduces one or more folds 102 into substrate layer 100. As illustrated in the figure, the folds 102 are oriented substantially perpendicular to the direction of feed or travel "B".

The cut-patterned layer 200 and substrate layer 100 are fed into a bonding mechanism 408 which couples the two layers to one another. Bonding between the two layers 100, 200 may be accomplished through the application of adhesive, heat and/or pressure or utilizing any other mechanism or substance. The bonded layers 100, 200 (whether cut into strips or fabricated without strips) may then be collected onto the roll or core "C". In some embodiment, the smaller strips may be wound onto separate smaller rolls (not shown). In other instances, as discussed earlier herein, the packaging material may, instead, be cut into sheets.

It will be understood that various steps 302 through 312 of method 300 may be performed in a different order and that, accordingly, the various mechanisms 402, 404, 406 408 of apparatus 400 will be differently arranged to suit the order of steps 302 through 312.

FIGS. 12 through 14B illustrate the manufacture of an exemplary packaging enclosure 12 having one or more expandable layers, utilizing an exemplary method indicated at 500. In some aspects, the method 500 is implemented by an apparatus (not shown) that provides customized sizing for packaging enclosures 12. In these aspects, the packaging enclosure 12 is customized in shape and size to retain and protect an item, object or article 14 within an interior cavity of the packaging enclosure 12, as will be described later herein. The item, object, or article 14 may also be referred to herein as the contents of the packaging enclosure.

In method 500, in step 502 the packaging material 10, 110, 210 with one or more expandable layers 100, 200 therein is received. The packaging material 10, 110, 210 may be provided on as a roll of material wound around a core "C" as in FIG. 11. The roll of packaging material 10, 110, 210 wound onto the core "C" may be provided to a packaging apparatus particularly configured to take a length of the packaging material, expand the one or more expandable layers 100, 200 and then form packaging enclosure 12 (FIG. 14A) therewith.

After the packaging material 10, 110, 210 is received as at 502 in method 500, at 504, the substrate layer 100 (i.e., first layer 100) is stretched or expanded longitudinally in a direction "A" (FIGS. 1 through 6) to unfold the one or more folds 102 formed therein. The stretching or expansion of the first layer 100 or substrate layer 100 is illustrated in FIGS. 1 and 2.

At 506, the cut-patterned layer 200 (i.e., second layer 200) is moved from an unexpanded condition to an expanded condition (such as is illustrated in FIGS. 3 and 4; or as illustrated in FIGS. 7 and 8 if folds 202 are present). The cut-patterned layer 200 is expanded as a result of the first layer 100 being expanded. As the cut-patterned layer 200 expands longitudinally, the layer 200 also expands in the Z-direction and thereby increases in height or thickness (as illustrated in FIGS. 7 and 8). The expansion of the cut-patterned layer 200 opens the slits 200*g* to form air pockets 200*g*'. The cut-patterned layer 200 expands longitudinally with the substrate layer 100 as the substrate layer 100 expands. If folds 202 are provided in cut-patterned layer 200, then folds 202 will unfold as the cut-patterned layer 200 expands, giving the cut-patterned layer 200 additional width. The expansion of second layer 200 gives structural strength to packaging material 10, 110, and 210.

At 508, a length of a packaging material 10, 110, 210 is determined for packaging a particular item, object, or article 14. The length may be determined automatically by a machine or manually by a person. The length is customizable based on the dimensions of the item, object, or article 14 to be enclosed within the packaging enclosure 12. In other embodiments, the length of the packaging material 10, 110, 210 may be a standard length that is utilized in all packaging enclosures. The standard length will be utilized regardless of the item, object, or article 14 to be packaged.

Figure 14A:
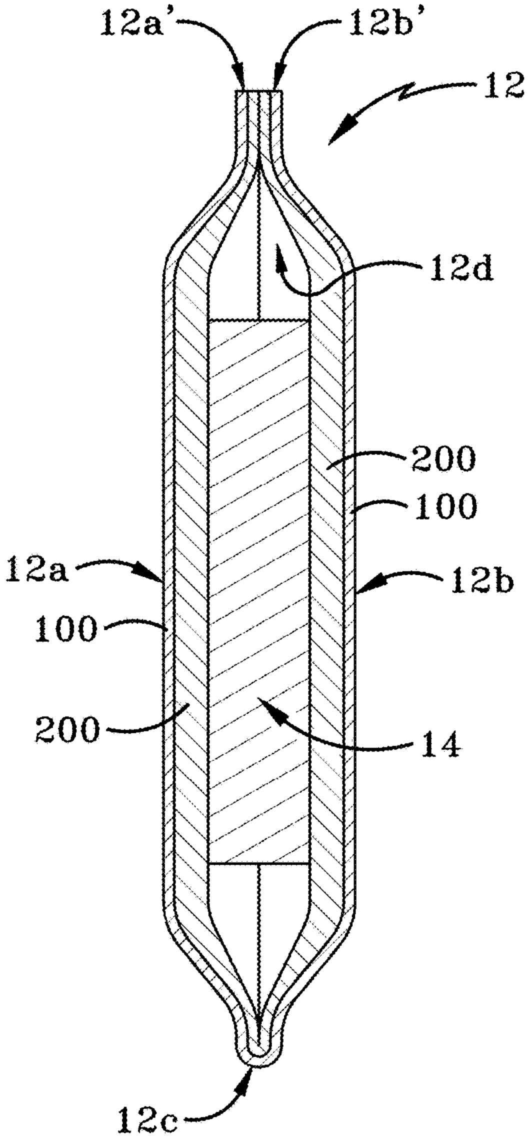
FIG. 14A is a vertical cross-section through the packaging enclosure taken along line 14A-14A of FIG. 13, wherein the packaging material is fabricated from two expandable layers.

The length of packaging material is folded generally in half to form a front 12*a* and a back 12*b* (FIG. 14A) of what will ultimately becoming packaging enclosure 12. Front 12*a* and back 12*b* are folded about a fold 12*c* (FIG. 14A). Front 12*a* terminates in a free end 12*a*' remote from fold 12*c*. Similarly, back 12*b* terminates in a free end 12*b*' remote from fold 12*c*.

At 510 in method 500 (FIG. 12), a bonding agent is applied to interior surfaces of the front 12*a* and back 12*b* of the length of packaging material being used to fabricate the packaging enclosure 12. First layer 100 in some embodiments 10, 110, 210 may include adhesive properties (e.g. a coating or an adhesive) in order to enable closure of the packaging enclosure 12 formed with packaging material 10, 110, 210. As an example, a coating may be present on the upper surface 100*a* of the first layer 100, particularly on the border regions that extend outwardly beyond the first and second sides 200*e*, 200*f* of second layer 200. The coating may bond in response to heat, pressure, and/or moisture, or a combination thereof. In various embodiments, a heat-sensitive coating may create and enclosure through a process done by hand or with the use of an apparatus designed for this purpose, or any combination thereof. The bonded front 12*a* and back 12*b* of packaging enclosure 12 bound and define an interior cavity 12*d* within which the item, object, or article 14 is received.

Once the side edges of the packaging enclosure 12 are bonded to one another and the item, object, or article 14 is received within the interior cavity 12*d*, the upper regions of front 12*a* and back 12*b* are bonded to one another to close off access to interior cavity 12*d*.

In other embodiments, not illustrated herein, two separate lengths of packaging material may be cut to suit the dimension of the item, object, or article 14 to be contained within the packaging enclosure 12. The two cut lengths are then bonded along a bottom edge and along opposed side edges (i.e., border regions of first layer 100) and to thereby form the interior cavity 12*d* into which the item, object, or article 14 is to be inserted. Ultimately, the two lengths of packaging material are sealed to one another along a top edge to enclose the item, object, or article 14 within the interior cavity of the packaging enclosure.

As is evident from FIG. 14A, the expanded second layer 200 contacts the item, object, or article 14 and protects the same from impact during shipping.

Figure 14B:
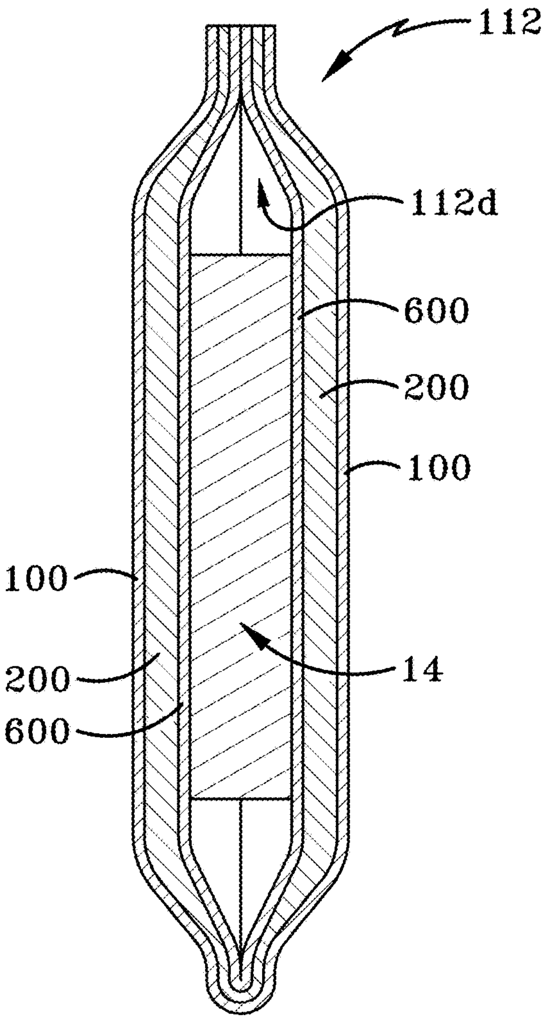
FIG. 14B is a vertical cross-section through the packaging enclosure taken along line 14B-14B of FIG. 13, wherein the packaging material is fabricated from three expandable layers.

Referring now to FIG. 14B, there is shown an alternative packaging enclosure 112 that is formed from a packaging material comprised of three layers, namely first layer 100, second layer 200, and a third layer 600. Third layer 600 is substantially identical in structure and function to first layer 100 and is arranged to be bonded or adhered to an opposite surface of second layer 200 from first layer 100 in such a way that the first layer 100, second layer 200 and third layer 600 are able to readily expanded. When the three layered packaging material is expanded and formed into the packaging enclosure 112, a first region of the packaging material forms the front 112*a* of the packaging enclosure 112. A second region of the expanded packaging material forms the back 112*b* of the packaging enclosure 112*b*. Preferably, a predetermined length of packaging material is folded along a fold 112*c* to form front 112*a* and back 112*b* but in other embodiments two separate sections of packaging material may be bonded along a bottom edge, along opposed border regions proximate the side edges of first layer 100. The two separate sections of packaging material are ultimately bonded or adhered to one another along a top edge thereof. First layer 100 becomes the exterior surface of the packaging enclosure 112 to which a mailing label (not numbered but shown in FIG. 13) is applied. Third layer 600 becomes an inner liner that bounds and defines the interior cavity 112*d* of packaging enclosure 112. Second layer 200 is the structurally strong and protective layer that aids in protecting the item, object, or article 14 during shipping.

It will be understood that in other embodiments, more than three layers may be provided in the packaging material that will ultimately be formed into customized packaging. More than one layer identical or similar to first layer 100 may be utilized in such packaging material. Furthermore, more than one layer identical or similar to second layer may be utilized in such packaging material.

In one aspect, the present disclosure is directed to a paper-based packaging system in which a packaging apparatus, machine or person can form a customized package (e.g., an envelope) or enclosure that is customized to an item, object, or article that is to be shipped to a consumer.

The second layer 200 of the packaging material 10, 110, 210 utilized in the packaging system in accordance with an aspect of the present disclosure comprises a filler material that elongates longitudinally (and/or laterally) when stretched or pulled. The filler material also elongates vertically, increasing in height or thickness but may shrink longitudinally or laterally as it expands vertically. The filler material includes a plurality of slits that open up and form air pockets therein as the filler material expands vertically. The filler material, i.e., second layer 200 may be initially cut to a length and/or width that is greater than the substrate layer 100 to which the second layer 200 is adhered or bonded. The additional length and/or width may be accommodated in one or more folds formed in the second layer 200. As the second layer 200 is stretched and expands longitudinally or laterally, and vertically, the folds in the second layer 200 unfold and therefore this layer 200 appears not to shrink during expansion of the packaging material.

In one aspect, a paper-based packaging material includes at least two layers. In some instances, the packaging material includes two layers, which may include a substrate layer 100 that is pulled or extended in at least a first direction (the X-direction or the Y-direction) that is effective to cause a second layer 200 of the packaging material to expand in at least a third direction (i.e., the Z-direction). In such instances, the second layer of material may also contract in a second direction (the X-direction or the Y-direction) which may include the direction normal (i.e., at right angles) to at least the first direction in which the first layer 100 is pulled.

For example, the paper-based packaging material may include two layers, with a liner (e.g., an expanding layer) and an outside solid paper so that when a packaging enclosure 12 is formed, the outside is smooth paper and the inside is the second layer 200 which forms a liner that is expanded in the Z-direction and includes a plurality of air pockets.

In some aspects, the paper-based packaging material may include at least three layers 100, 200, and 600 (FIG. 14B). The at least three layers may include an inner solid paper layer 100, an outer solid paper layer 600, and an expanding core layer 200 disposed between the inner and outer layers of solid paper. Alternatively, or additionally, the paper based packaging material 10, 110, 210, may include one or more expanding core layers 200 (e.g. of the same or different types of expansion coefficients oriented in a same direction or in different directions. In other words, some of the one or more core layers may have a different pattern of slits 200*g* cut therein and therefore produce different shape and sizes of air pockets 200*g*' therein and or which may expand to various different thicknesses based on the patterns of slits formed therein. The inner and outer layers 100, 600 may be of a similar type or weight of paper or they may be of different types of weights of paper. The different types or weights of paper used for inner and outer layers 100, 600 may provide different levels of packaging protection, durability, or the like.

In various aspects, a packaging apparatus may manipulate the paper-based packaging material 10, 110, 210 in various combinations of one or more directions to cause an increase in thickness or Z-height of the second layer 200 and other similar core layers.

In some instances, a substrate layer 100 (or 600) is pulled and extended in one direction to cause expansion of a liner 100 (or 600) and/or core layer 200 in thickness.

In some aspects, the direction of pull on the substrate layer 100 (or 600) to cause expansion of the core layer 200 may be east or west or north or south or a combination thereof either simultaneously or sequentially. In other words, the direction of the folds in the substrate layer 100 and liner layer 600 relative to the core layer 200 could be in the same direction or in different directions relative to one another.

Some example embodiments of paper-based packaging material in accordance with aspects of the present disclosure include a) a substrate layer (e.g., inner, intermediate, or outer paper-based layer that is solid and/or folded) and an expanding layer 200 that may form a liner of a packaging enclosure; b) a first substrate layer, a first expanding liner, and a second expanding layer (in any order); c) a first substrate layer, a first expanding liner, a second expanding layer, and a second substrate layer (in any order); d) a first substrate layer, a first expanding liner, a second substrate layer, a second expanding layer, and a third substrate layer (in any order); and e) a first substrate layer (inner), a first expanding liner, a second substrate layer (middle), a second expanding layer, and a third substrate layer (outside), wherein the layers may be folded or oriented in the same direction or in different directions.

In some aspects, the paper-based packaging material 10, 110, 210 may be formed into a roll (as illustrated in FIG. 11), or into sheets or the like. As such, the packaging material 10, 110, 210 is suitable for various levels of packaging automation or preforming into any size or shape of enclosure or envelope. For example, a retailer may receive a roll of the paper-based packaging material 10, 110, 210 which may be formed, on site, into any suitable shape and size of envelope for the products that the retailer sells.

In some aspects, the filler or core material, i.e., second layer 200, may elongate longitudinally but may shrink laterally or may elongate laterally and shrink longitudinally.

In some aspects, the length and or width of the second layer 200 may be increased and the second layer 200 may be folded accordingly to compensate for the lateral or longitudinal shrinking of the layer 200 when stretched.

In some aspects, the paper-based packaging material is formed such that the material can feed a machine with a minimum amount of air.

In some aspects, an inner or outer layer (100 or 600) is folded such that the layer is able to expand when stretched or pulled in the X or Y direction.

In some aspects, the core or inner layer 200 is formed and/or cut such that extra material is available for width (or length), depending on the direction in which the substrate layer 100 is to be pulled. In other words, the inner or core layer 200 may have a dimension greater than the substrate layer 100 or liner 600 such that when the core layer 200 is stretched so as to increase in height (or thickness), i.e., is expanded in the Z-direction), the excess width (or length) of the core layer 200 maintains an approximate width of the substrate layer 10 when pulled or extended from one end.

In some aspects, the filler, core, or inner layer 200 is overlaid or disposed on a liner layer 100, 600 that is solid folded paper. In some aspects, the filler layer 200 is attached at points along an edge of the liner layer 100, 600, allowing the liner layer 100, 600 to be pulled in an X-direction or a Y-direction.

When the liner layer 100, 600 is pulled or expanded, the filler or core layer 200 expands across the liner layer 100, 600, which is effective to cause the filler or core layer 200 to expand in the Z-direction. In some aspects, the filler layer 200 may be folded differently from the liner layer 100, 600 (e.g., diagonally). This arrangement causes expansion of the filler layer 200 when the liner layer 100, 600 is expanding in the X-direction or the Y direction.

As discussed earlier herein, the terms "substrate layer" and "carrier layer" used herein refer to a layer to which one or more other layers are adhered or bonded and which has an ability to activate at least one of those one or more other layers, causing it to expand. It should be understood that although the first layer 100 (or substrate or carrier layer 100) is disclosed herein as including one or more folds that enable the first layer to be selectively expanded or extended, in other embodiments, the first layer may be gathered or crinkled or include tabs and nodes that allow the paper to be expanded in one or more directions without the provision of folds.

It will further be understood that packaging material 10 instead of being pulled in only a first direction "A" (as in FIG. 1), the packaging material may be pulled in a combination of different directions, either concurrently or sequentially. In order to enable packaging material 10 to expand in a combination of different directions, at least the first layer will be provided with a combination of folds that are oriented and arranged in such a way that the enable expansion of at least the first layer in these various different directions.

The second layer 200 is a product that elongates when stretched. In one aspect, the second layer 200 will elongate longitudinally. In one embodiment, the second layer 200 has a pattern of cuts formed therein (i.e., the cut-patterned layer). The cut-patterned layer 200 elongates when stretched (i.e., expanded) but may shrink in width, as it elongates. The cut-patterned layer 200 is adhered to the substrate layer 100. The dimensions of the cut-patterned layer is longer than, equal to, or smaller than the substrate layer 100.

First layer 100 is configured to be pulled or extended in at least a first direction (e.g., in two planes such as X, Y, or X and Y) that is effective to cause the second layer 200, or the cut-patterned layer, of the packaging material 10 to expand into at least one plane (e.g. Z-direction). The cut-patterned layer 200 has the benefit of creating structural strength in the packaging material 10 once the packaging material 10 is moved from an unexpanded condition to an expanded condition. The cut-patterned layer 200 may contract in a second direction (X or Y), which may include the direction normal to the first direction in which the substrate layer 100 is pulled or extended. To compensate for any such contraction, the cut-patterned layer 200 may include extra material that extends when the cut-patterned layer 200 is pulled into the expanded configuration. In other embodiments (not illustrated herein), the second layer 200 may be configured or manufactured such that the second layer 200 is able to expand in the Z-direction without undergoing contraction in the X and/or Y direction.

In some aspects, packaging material 10 includes two layers adhered to one another.

Packaging material 10 may be configured to enable flexibility for package size and to facilitate shipping of bulk rolls of the packaging material 10 when in an unexpanded condition. Preferably, packaging material 10 is formed from material that are recyclable. In one embodiment, each of the one or more layers in packaging material 10 is made from entirely recyclable materials. One suitable material for use as each of the one or more layers is paper.

Various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms.

The articles "a" and "an," as used herein in the specification and in the claims, unless clearly indicated to the contrary, should be understood to mean "at least one." The phrase "and/or," as used herein in the specification and in the claims (if at all), should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc. As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments. It will also be appreciated by those of skill in the art that references to a structure or feature that is disposed "adjacent" another feature may have portions that overlap or underlie the adjacent feature.

Spatially relative terms, such as "under", "below", "lower", "over", "upper", "above", "behind", "in front of", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal", "lateral", "transverse", "longitudinal", and the like are used herein for the purpose of explanation only unless specifically indicated otherwise.

Although the terms "first" and "second" may be used herein to describe various features/elements, these features/elements should not be limited by these terms, unless the context indicates otherwise. These terms may be used to distinguish one feature/element from another feature/element. Thus, a first feature/element discussed herein could be termed a second feature/element, and similarly, a second feature/element discussed herein could be termed a first feature/element without departing from the teachings of the present invention.

An embodiment is an implementation or example of the present disclosure. Reference in the specification to "an embodiment," "one embodiment," "some embodiments," "one particular embodiment," "an exemplary embodiment," or "other embodiments," or the like, means that a particular feature, structure, or characteristic described in connection with the embodiments is included in at least some embodiments, but not necessarily all embodiments, of the invention. The various appearances "an embodiment," "one embodiment," "some embodiments," "one particular embodiment," "an exemplary embodiment," or "other embodiments," or the like, are not necessarily all referring to the same embodiments.

If this specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical range recited herein is intended to include all sub-ranges subsumed therein.

Additionally, the method of performing the present disclosure may occur in a sequence different than those described herein. Accordingly, no sequence of the method should be read as a limitation unless explicitly stated. It is recognizable that performing some of the steps of the method in a different order could achieve a similar result.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of various embodiments of the disclosure are examples and the disclosure is not limited to the exact details shown or described.

What is claimed:

1. A method comprising:

receiving a sheet of a packaging material comprising a first layer of a first structural configuration and a second layer of a second structural configuration which differs from the first structural configuration, wherein the first layer comprises a plurality of crinkles in an unexpanded condition;

applying a force to the sheet of the packaging material;

expanding each of the first layer and the second layer to form an expanded packaging material, wherein expanding the first layer includes flattening the plurality of crinkles provided in the first layer; and forming a packaging enclosure from the expanded packaging material.

2. The method according to claim 1, wherein the plurality of crinkles are gathered together when the first layer is in the unexpanded state.

3. The method according to claim 1, further comprising selecting a length of the packaging material for the packaging enclosure based on dimensions of an item to be shipped in the packaging enclosure.

4. The method according to claim 1, wherein expanding the first layer comprises expanding the first layer in a first direction and expanding the second layer comprises expanding the second layer in the first direction.

5. The method according to claim 4, wherein expanding the second layer further comprises expanding the second layer in a second direction orthogonal to the first direction.

6. The method according to claim 1, wherein expanding each of the first layer and the second layer includes:

expanding the first layer in a first direction;

expanding the second layer in the first direction in response to expansion of the first layer in the first direction; and expanding the second layer in a second direction which is normal to the first direction.

7. The method according to claim 6, wherein expanding the second layer in one or both of the first direction and the second direction occurs one of simultaneously and sequentially with expanding the first layer in the first direction.

8. The method according to claim 7, further comprising increasing a thickness of the second layer through expanding the second layer in the second direction.

9. The method according to claim 7, further comprising:

increasing a length of the first layer and the second layer through expanding the first layer and the second layer in the first direction; and narrowing a width of the first layer and the second layer through expanding the first layer and the second layer in the first direction.

10. The method according to claim 1, further comprising providing the first layer and the second layer in a recyclable material.

11. The method according to claim 1, wherein expanding the second layer includes opening up a plurality of slits provided in the second layer to form air pockets in the second layer.

12. The method according to claim 1, further comprising positioning the first layer and the second layer adjacent to one another prior to expanding the first layer and the second layer.

13. The method according to claim 1, further comprising:

providing a third layer of the first structural configuration in the packaging material; and positioning the second layer between the first layer and the third layer.

14. The method according to claim 13, further comprising:

expanding the first layer and the third layer in a first direction;

expanding the second layer in the first direction;

expanding the second layer in a second direction normal to the first direction; and increasing a thickness of the second layer as the second layer is expanded in the second direction.

15. The method according to claim 14, further comprising positioning the first layer, the second layer, and the third layer adjacent to one another in an expanded condition prior to forming the packaging enclosure.

16. The method according to claim 1, further comprising:

folding the expanded packaging material about a fold line;

bonding side edges of the folded expanded packaging material to one another; and defining an interior cavity between a first wall and a second wall and the bonded side edges of the bonded and expanded packaging material.

17. The method according to claim 16, further comprising:

inserting an item to be shipped into the interior cavity; and bonding a top edge of the packaging enclosure to enclose the item to be shipped in the interior cavity and to prevent access to the interior cavity.

18. A method of forming packaging material comprising:

providing a first layer of a first structural configuration, wherein the first layer comprises a plurality of crinkles in an unexpanded condition;

providing a second layer of a second structural configuration that is different from the first structural configuration;

expanding the first layer from a first length to a second length;

expanding the second layer from a first length to a second length in conjunction with or in response to expansion of the first layer; and increasing a thickness of the second layer in response to the second layer expanding from the first length to the second length.

19. The method according to claim 18, further comprising:

providing a third layer having a structural configuration which enables the third layer to expand from a first length to a second length in conjunction with or in response to expansion of the first layer; and interposing the second layer between the first layer and the third layer.

20. The method according to claim 19, further comprising:

moving the first layer, the second layer, and the third layer into an expanded condition;

forming a front and a back of a packaging enclosure with the packaging material when the first layer, the second layer, and the third layer are in the expanded condition;

defining an interior cavity between the front and the back;

inserting an item into the interior cavity;

securing the front and back to one another; and retaining the item in the interior cavity.

* * * * *